(12) United States Patent
Enger et al.

(10) Patent No.: US 7,670,505 B2
(45) Date of Patent: Mar. 2, 2010

(54) COMPOUNDS COMPRISING 2,6-NAPHTHYL GROUPS

(75) Inventors: Olivier Enger, Ludwigshafen (DE);
Ruediger Sens, Ludwigshafen (DE);
Christian Lennartz, Schifferstadt (DE);
Robert Parker, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 53 days.

(21) Appl. No.: 11/914,365

(22) PCT Filed: May 10, 2006

(86) PCT No.: PCT/EP2006/062220
§ 371 (c)(1), (2), (4) Date: Nov. 13, 2007

(87) PCT Pub. No.: WO2006/120220
PCT Pub. Date: Nov. 16, 2006

(65) Prior Publication Data
US 2008/0221289 A1   Sep. 11, 2008

(30) Foreign Application Priority Data
May 11, 2005  (DE) ........................ 10 2005 022 642

(51) Int. Cl.
C09K 19/32 (2006.01)
C09K 19/38 (2006.01)
C07C 69/76 (2006.01)
C08F 16/20 (2006.01)
C08F 20/10 (2006.01)

(52) U.S. Cl. .................. 252/299.62; 560/100; 526/321; 526/326; 526/328

(58) Field of Classification Search ............ 252/299.62; 560/100; 526/321, 326, 328
See application file for complete search history.

(56) References Cited

U.S. PATENT DOCUMENTS 5,770,108 A * 6/1998 Totani et al. ........... 252/299.61

FOREIGN PATENT DOCUMENTS

| DE | 42 40 041 | 6/1994 |
| DE | 197 17 371 | 10/1998 |
| EP | 0 332 409 | 9/1989 |
| EP | 0 341 922 | 11/1989 |
| EP | 0 982 621 | 3/2000 |
| WO | 99/19267 | 4/1999 |

OTHER PUBLICATIONS

English translation by machine for DE 4240041, 1994, http://epo.worldlingo.com/wl/epo/epo. html?SEED=DE4240041 &SEED_FORMAT=E&Action=Description&OPS= ops.espacenet.com&LOCALE=en_EP&T=1.*
Caplus 2005: 23540.*
Han et al., "Synthesis of Thermotropic LCPs Using p-Methoxycarbonyloxy Aromatic Acids", J. og Polymer Sci. Part A, 1999, vol. 37, (11), pp. 1703-1707.*
Espinosa, M.A. et al., "New Cholesteric Liquid-Crystal Epoxy Resins Derived from 6-Hydroxy-2-naphthoic Acid", Journal of Polymer Science : Part A: Polymer Chemistry, vol. 39, pp. 2847-2858, 2001.
Kricheldorf, Hans R. et al., "New polymer syntheses 87. Thermosetting nematic or cholesteric diesters having propargyl endgroups", High Performance Polymers 9, pp. 75-90, 1997.

* cited by examiner

Primary Examiner—Shean C Wu
(74) Attorney, Agent, or Firm—Oblon, Spivak, McClelland, Maier & Neustadt, L.L.P.

(57) ABSTRACT

Compounds of the general formula I

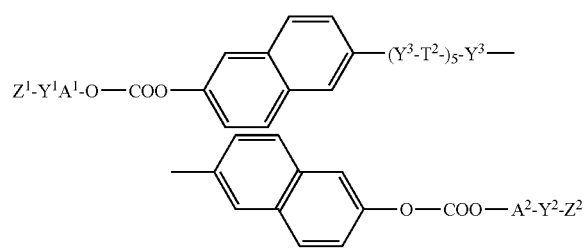

(variables defined herein) and processes for making compounds including 2,6 -naphthyl radicals are provided. Polymerizable or nonpolymerizable liquid-crystalline compositions including one or more compounds including 2,6 -naphthyl radicals, and products and processes employing such compositions, are also provided.

15 Claims, No Drawings

COMPOUNDS COMPRISING 2,6-NAPHTHYL GROUPS

The present invention relates to compounds of the general formula I

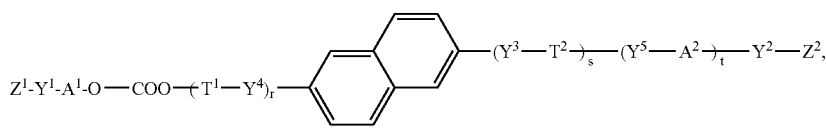

in which the variables are each defined as follows:

$Z^1$, $Z^2$ are each independently hydrogen, optionally substituted $C_1$-$C_{20}$-alkyl in which the carbon chain may be interrupted by oxygen atoms in ether function, sulfur atoms in thioether function or by nonadjacent imino or $C_1$-$C_4$-alkylimino groups, or reactive radicals by means of which polymerization can be brought about, $A^1$, $A^2$ are each independently spacers having from 1 to 30 carbon atoms, in which the carbon chain may be interrupted by oxygen atoms in ether function, sulfur atoms in thioether function or by nonadjacent imino or $C_1$-$C_4$-alkylimino groups, $Y^1$, $Y^2$ are each independently a chemical single bond, oxygen, sulfur, —CO—, —O—CO—, —CO—O—, —S—CO—, —CO—S—, —NR—CO— or —CO—NR—, $Y^3$, $Y^4$ are each independently a chemical single bond, oxygen, sulfur, —CR═CR—, —C≡C—, —CR═CR—CO—O—, —O—CO—CR═CR—, —C≡C—O—, —O—C≡C—, —CH$_2$—CH$_2$—, —CH$_2$—O—, —O—CH$_2$—, —CH$_2$—S—, —S—CH$_2$—, —CO—, —O—CO—, —CO—O—, —S—CO—, —CO—S—, —NR—CO—, —CO—NR—, —O—CO—O—, —O—CO—NR— or —NR—CO—O—, R is hydrogen or $C_1$-$C_4$-alkyl, $Y^5$ independently of $Y^1$ and $Y^2$, is as defined therefore above or is —O—COO—, $T^1$, $T^2$ are divalent saturated or unsaturated, optionally substituted iso- or heterocyclic radicals, r, t are each independently 0 or 1 and s is 0, 1, 2 or 3, where the particular variables $T^2$ and $Y^3$, in the case that s>1, may be the same as one another or different from one another and both the hydrogen atoms in the 2,6-naphthyl radical and the hydrogen atoms bonded to carbon atoms in the variables $Z^1$, $Z^2$, $A^1$, $A^2$, $Y^3$, $Y^4$, R, $T^1$ and $T^2$ may be substituted partly or fully by halogen atoms.

The invention further relates to a polymerizable or nonpolymerizable liquid-crystalline composition comprising one or more of the inventive compounds, to an oligomer or polymer obtainable by oligomerization or polymerization of a polymerizable inventive liquid-crystalline composition, to a process for printing or coating a substrate by applying a polymerizable inventive liquid-crystalline composition to the substrate and subsequent polymerization, to the use of the inventive liquid-crystalline composition or of the inventive oligomer or polymer for producing optical or electrooptical components, to a process for preparing selected inventive compounds, and to intermediates which are particularly suitable for preparing the selected inventive compounds.

On heating, numerous compounds are not converted from the crystalline state with defined short-range and long-range order of the molecules directly into the liquid, unordered state, but rather pass through a liquid-crystalline phase in which the molecules are mobile but the molecular axes form an ordered structure. In this case, stretched molecules often form nematic liquid-crystalline phases which are characterized by long-range order of orientation by virtue of parallel arrangement of the longitudinal axes of the molecules. When such a nematic phase comprises chiral compounds or chiral molecular moieties, a chiral nematic or cholesteric phase can form, which is characterized by a helical superstructure.

Owing to their remarkable optical properties, liquid-crystalline materials, especially nematic, chiral nematic or cholesteric materials, are of interest in optical or electrooptical applications among others. However, the temperature range in which the liquid-crystalline phase occurs is often outside the desired application temperature or it extends only over a small temperature interval.

When the intention is to fix the liquid-crystalline ordered structures in the solid state, there are various possibilities. In addition to glasslike solidification in the course of cooling from the liquid-crystalline state, there is the possibility of polymerization into polymeric networks or, in the case that the liquid-crystalline compounds comprise polymerizable groups, of polymerizing the liquid-crystalline compounds themselves.

Furthermore, maximum refraction of the liquid-crystalline materials is often desired. Under this aspect, especially liquid-crystalline materials which comprise 2,6-naphthyl radicals appear to possess high potential.

Polymerizable cholesteric compounds which comprise 2,6-naphthyl radicals and reactive glycidyl radicals are disclosed, for example, in the publication of M. A. Espinosa et al., Journal of Polymer Science Part A, Polymer Chemistry, Vol. 39, 2847-2858 (2001), thermally curable, nematic and cholesteric diesters which have 2,6-naphthyl radicals and reactive propargyl end groups, in the publication of H. R. Kricheldorf and A. Gerken, High Performance Polymers 9 (1997), 75-90 and in the document DE 197 17 371 A1. Non-polymerizable compounds comprising 2,6-naphthyl radicals are disclosed in the document EP 0 982 621 A2.

It was an object of the present invention to provide further compounds which are suitable for the preparation of liquid-crystalline compositions and have comparatively high birefringent properties, which, themselves or in the form of such compositions, have a sufficiently large phase width for processing.

Accordingly, the compounds of the formula I described at the outset have been found.

For the variables $Z^1$ and $Z^2$ in formula I, $C_1$-$C_{20}$-alkyl whose $C_1$-$C_{20}$ carbon chain may be interrupted by oxygen atoms in ether function is, for example, methyl, ethyl, propyl, isopropyl, butyl, isobutyl, sec-butyl, tert-butyl, pentyl, isopentyl, neopentyl, tert-pentyl, hexyl, 2-methylpentyl, heptyl, hept-3-yl, octyl, 2-ethylhexyl, isooctyl, nonyl, isononyl, decyl, isodecyl, undecyl, dodecyl, tridecyl, 3,5,5,7-tetramethylnonyl, isotridecyl (the above terms isooctyl, isononyl, isodecyl and isotridecyl are trivial names and stem from the alcohols obtained by the oxo process—on this subject, cf. Ullmanns Encyklopädie der technischen Chemie, 4th Edition, volume 7, pages 215 to 217, and also volume 11, pages 435 and 436), tetradecyl, pentadecyl, hexadecyl, heptadecyl, octadecyl, nonadecyl, eicosyl, methoxymethyl, 2-ethylhexoxymethyl, 2-methoxyethyl, 2-ethoxyethyl, 2-propoxyethyl, 2-isopropoxyethyl, 2-butoxyethyl, 2- or 3-methoxy-propyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl or 3,6,9,12-tetraoxatetradecyl; corresponding $C_1$-$C_{20}$-alkyl whose $C_1$-$C_{20}$ carbon chain may be interrupted by sulfur atoms in thioether function, nonadjacent imino, $C_1$-$C_{20}$-alkylimino and/or carbonyl groups can be derived formally from the oxygen-comprising radicals listed above by way of example by replacing the oxygen atoms with sulfur atoms, nonadjacent imino, $C_1$-$C_{20}$-alkylimino and/or carbonyl groups.

Suitable reactive radicals $Z^1$ and $Z^2$ by means of which polymerization can be brought about are, for example,

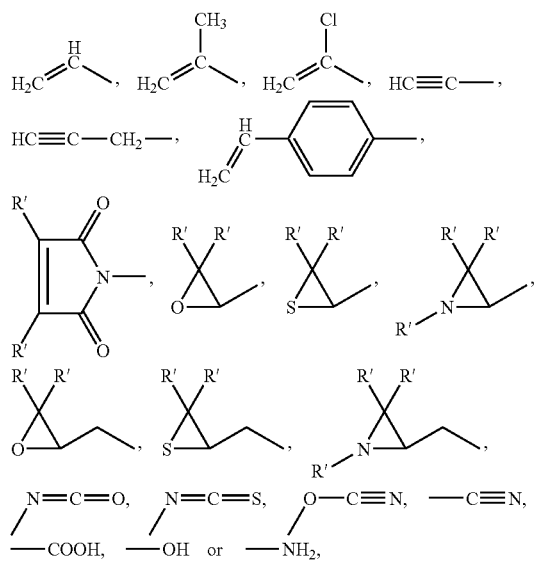

polymerization being understood to mean all reactions increasing the molecular weight of polymers, i.e. addition polymerizations as chain reactions, addition polymerization as staged reactions and condensation polymerizations.

The variables R' of the reactive radicals shown above by way of example are hydrogen or $C_1$-$C_4$-alkyl, i.e. methyl, ethyl, n-propyl, isopropyl, n-butyl, sec-butyl, isobutyl or tert-butyl, and may be the same or different.

Compounds having cyanate radicals may trimerize spontaneously to the corresponding cyanurates, and those having cyano radicals, especially with catalysis by acids, for example hydrochloric acid, or bases, to the corresponding triazines. Compounds having epoxide, thiirane, aziridine, isocyanate and isothiocyanate groups typically require further compounds with complementary reactive groups for polymerization. For example, isocyanates can polymerize with alcohols to give urethanes and with amines to give urea derivatives. The situation is similar for thiiranes and aziridines. The complementary reactive groups may be present in a second inventive compound which is mixed with the first, or they may be introduced into the polymerization mixture by auxiliary compounds which comprise two or more of these complementary groups. When these compounds comprise in each case two of these reactive groups, linear polymers having predominantly thermoplastic character are thus formed. When the compounds comprise more than two reactive groups, crosslinked polymers form which are mechanically particularly stable. The maleimido group is particularly suitable for free-radical copolymerization with olefinic compounds such as styrene.

Preferred reactive radicals $Z^1$ and $Z^2$ in the inventive compounds are selected from the group consisting of

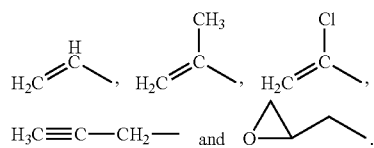

Particularly preferred reactive radicals $Z^1$ and $Z^2$ are

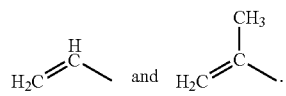

Preferred reactive moieties $Z^1$-$Y^1$ and $Z^2$-$Y^2$ in the inventive compounds are selected from the group consisting of

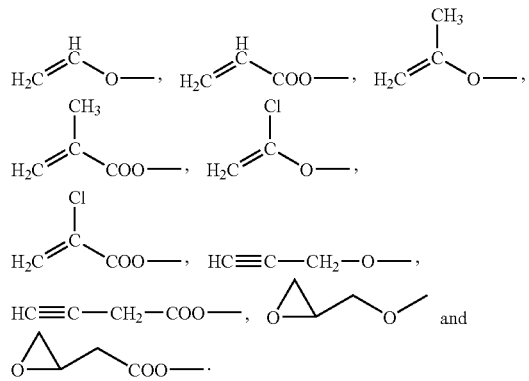

Particularly preferred reactive moieties $Z^1$-$Y^1$ and $Z^2$-$Y^2$ in this context are

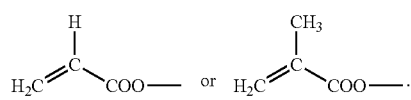

The variable R which appears in the bridges $Y^1$ to $Y^4$ is, in addition to hydrogen, also $C_1$-$C_4$-alkyl, i.e. methyl, ethyl, n-propyl, isopropyl, n-butyl, sec-butyl, isobutyl or tert-butyl.

Useful spacers $A^1$ and $A^2$ are all groups known for this purpose. The spacers comprise from 1 to 30, preferably from 3 to 12, carbon atoms and consist of predominantly linear aliphatic groups. They may be interrupted in the chain, for example, by nonadjacent oxygen or sulfur atoms or imino or $C_1$-$C_4$-alkylimino groups such as methylimino groups. Possible substituents for the spacer chain include fluorine, chlorine, bromine, cyano, methyl and ethyl. In particular, hydrogen atoms bonded to carbon atoms in the spacer chain may be substituted partly or fully by fluorine atoms.

Representative spacers $A^1$ and $A^2$ are, for example:

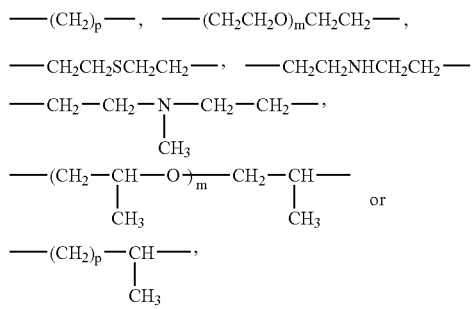

where m is from 1 to 3 and p is from 1 to 12.

The $T^1$ and $T^2$ radicals are divalent saturated or unsaturated, iso- or heterocyclic radicals. These may consist not only of one ring, but also of a plurality of rings fused to one another. For example, $T^1$ and $T^2$ also include divalent quinoline, decaline or naphthalene radicals.

The $T^1$ and $T^2$ radicals in the polymerizable liquid-crystalline compounds of the formula I are preferably divalent radicals selected from the group consisting of

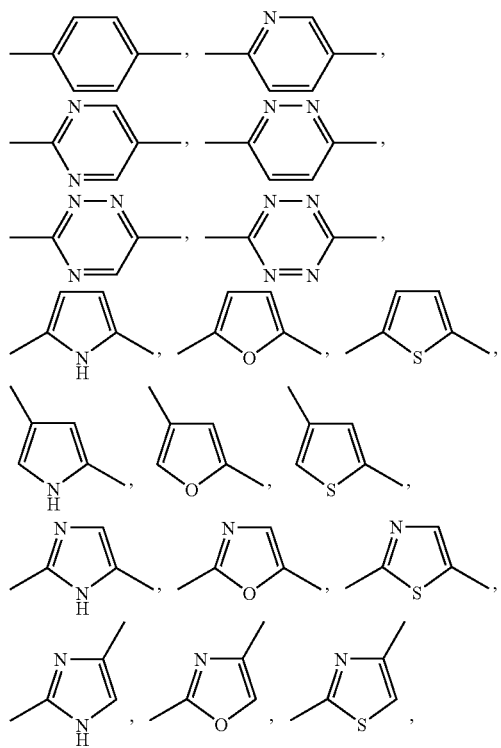

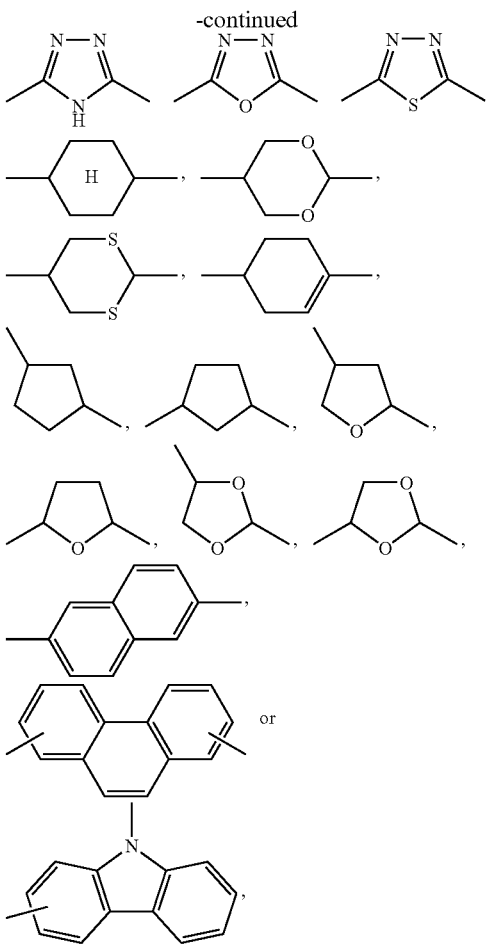

where the radicals

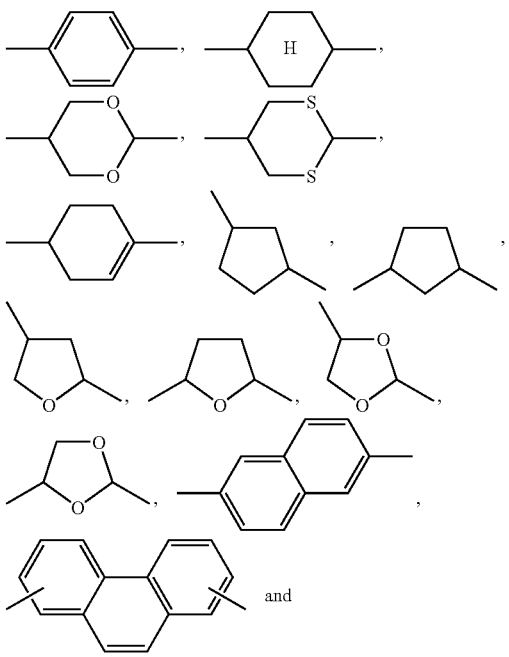

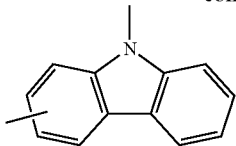

may be substituted by up to four identical or different substituents, the radical

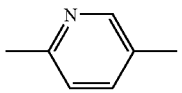

may be substituted by up to three identical or different substituents, the radicals

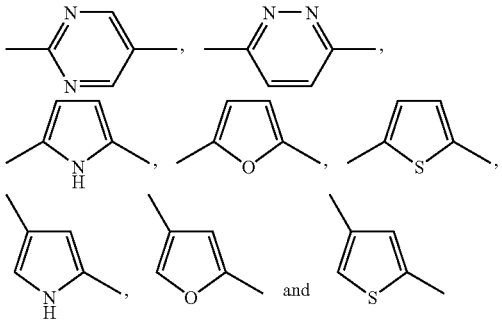

may be substituted by up to two identical or different substituents and the radicals

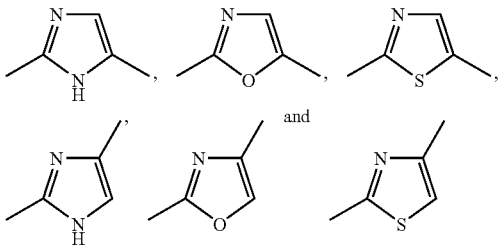

may be substituted by one substituent halogen, $NO_2$, NO, CN, CHO, $L^1$, CO-$L^1$, $X^1$—CO-$L^1$, $X^1$—SO-L, $X^1$—$SO_2$-$L^1$, $X^1$-$L^{1'}$, CO—$X^1$-$L^1$, O—CO—$X^1$-$L^1$, SO—$X^1$-$L^{1'}$ or $SO_2$—$X^1$-$L^{1'}$, where $L^1$ is $C_1$-$C_{20}$-alkyl, $C_2$-$C_{20}$-alkenyl, $C_2$-$C_{20}$-alkynyl, $C_6$-$C_{10}$-aryl, heteroaryl having from 2 to 12 carbon atoms, $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_1$-$C_{20}$-alkenyl or heteroaryl-$C_1$-$C_{20}$-alkynyl having in each case from 2 to 12 carbon atoms in the heteroaryl radical, where the $C_1$-$C_{20}$ carbon chain may be interrupted by oxygen atoms in ether function, sulfur atoms in thioether function, nonadjacent imino, $C_1$-$C_{20}$-alkylimino and/or carbonyl groups, and both the $C_6$-$C_{10}$-aryl and the heteroaryl may be substituted by one or more substituents selected from the group consisting of halogen, $NO_2$, NO, CN, CHO, $L^2$, CO-$L^2$, $X^2$—CO-$L^2$, $X^2$—SO-$L^2$, $X^2$—$SO_2$-$L^2$, $X^2$-$L^{2'}$, CO—$X^2$-$L^{2'}$, O—CO—$X^2$-$L^{2'}$, SO—$X^2$-$L^{2'}$ and $SO_2$—$X^2$-$L^{2'}$, $L^{1'}$ is hydrogen or, independently of $L^1$, as defined for $L^1$, $L^2$ is $C_1$-$C_{20}$-alkyl, $C_2$-$C_{20}$-alkenyl, $C_2$-$C_{20}$-alkynyl, $C_6$-$C_{10}$-aryl, heteroaryl having from 2 to 12 carbon atoms, $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_2$-$C_{20}$-alkenyl or heteroaryl-$C_2$-$C_{20}$-alkynyl having in each case from 2 to 12 carbon atoms in the heteroaryl radical, $L^{2'}$ is hydrogen or, independently of $L^2$, as defined for $L^2$ and $X^1$, $X^2$ are each independently oxygen, sulfur or $NL^{1'}$ or $NL^{2'}$, where some or all of the hydrogen atoms bonded to carbon atoms in the $L^1$ and/or $L^2$ radicals may be substituted by halogen atoms.

Examples of the variables $L^1$ and $L^{1'}$ in the definition of a $C_1$-$C_{20}$-alkyl whose $C_1$-$C_{20}$ carbon chain may be interrupted by oxygen atoms in ether function, sulfur atoms in thioether function, nonadjacent imino, $C_1$-$C_{20}$-alkylimino and/or carbonyl groups, and also of the variables $L^2$ and $L^{2'}$ in the definition of a $C_1$-$C_{20}$-alkyl, have already been listed by way of example above for the variables $Z^1$ and $Z^2$.

Examples of the variables $L^1$ and $L^{1'}$ in the definition of a $C_2$-$C_{20}$-alkenyl whose $C_2$-$C_{20}$ carbon chain may be interrupted by oxygen atoms in ether function, sulfur atoms in thioether function, nonadjacent imino, $C_1$-$C_{20}$-alkylimino and/or carbonyl groups, and also of the variables $L^2$ and $L^{2'}$ in the definition of a $C_2$-$C_{20}$-alkenyl, are in particular $C_2$-$C_{20}$-alk-1-enyl radicals. These radicals can be derived from suitable radicals listed above by way of example for the variables $Z^1$ and $Z^2$ by formal replacement of two hydrogen atoms which are located on adjacent carbon atoms by one further carbon-carbon bond.

Examples of the variables $L^1$ and $L^{1'}$ in the definition of a $C_2$-$C_{20}$-alkynyl whose $C_2$-$C_{20}$ carbon chain may be interrupted by oxygen atoms in ether function, sulfur atoms in thioether function, nonadjacent imino, $C_1$-$C_{20}$-alkylimino and/or carbonyl groups, and also of the variables $L^2$ and $L^{2'}$ in the definition of a $C_2$-$C_{20}$-alkynyl, are in particular $C_2$-$C_{20}$-alk-1-ynyl radicals. These radicals can be derived from suitable radicals listed above by way of example for the variables $Z^1$ and $Z^2$ by formal replacement of four hydrogen atoms which are located on adjacent carbon atoms by two further carbon-carbon bonds.

Examples of the variables $L^1$ and $L^{1'}$ in the definition of $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_2$-$C_{20}$-alkenyl and heteroaryl-$C_2$-$C_{20}$-alkynyl having in each case from 2 to 12 carbon atoms in the heteroaryl radical, where the $C_1$-$C_{20}$ carbon chain may be interrupted by oxygen atoms in ether function, sulfur atoms in thioether function, nonadjacent imino, $C_1$-$C_{20}$-alkylimino and/or carbonyl groups, and also of the variables $L^2$ and $L^{2'}$ in the definition of $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_2$-$C_{20}$-alkenyl and heteroaryl-$C_2$-$C_{20}$-alkynyl having in each case from 2 to 12 carbon atoms in the heteroaryl radical are in particular those radicals which can be derived from the radicals listed above by way of example for the variables $Z^1$ and $Z^2$ by formal replacement of a terminal hydrogen atom by $C_6$-$C_{10}$-aryl or heteroaryl having from 2 to 12 carbon atoms.

For the variables $L^1$ and $L^{1\prime}$ and also $L^2$ and $L^{2\prime}$, $C_6$-$C_{10}$-aryl is in particular phenyl and naphthyl.

For the variables $L^1$ and $L^{1\prime}$ and also $L^2$ and $L^{2\prime}$, heteroaryl having from 2 to 12 carbon atoms includes those radicals which derive, for example, from pyrrole, furan, thiophene, pyrazole, isoxazole, isothiazole, imidazole, 1H-1,2,3-triazole, 1H-1,2,4-triazole, pyridine, pyrazine, pyridazine, 1H-azepine, 2H-azepine, oxazole, thiazole, 1,2,3-, 1,2,4- or 1,3,4-oxadiazole, 1,2,3-, 1,2,4- or 1,3,4-thiadiazol, and also if appropriate the benzo- or dibenzo fused rings, for example quinoline, isoquinoline, indole, benzo[b]furan(coumarone), benzo[b]thiophene(thionaphthene), carbazole, dibenzofuran, dibenzothiophene, 1H-indazole, indoxazole, benzo[d]isothiazole, anthranil, benzimidazole, benzoxazole, benzothiazole, quinoline, phthalazine, quinazoline, quinoxaline or phenazine.

In the case of the variables $L^1$ and $L^{1\prime}$, the $C_6$-$C_{10}$-aryl or heteroaryl having from 2 to 12 carbon atoms may be substituted by one or more substituents halogen, $NO_2$, NO, CN, CHO, $L^2$, CO-$L^2$, $X^2$—CO-$L^2$, $X^2$—SO-$L^2$, $X^2$—$SO_2$-$L^2$, $X^2$—$L^{2\prime}$, CO—$X^2$-$L^{2\prime}$, O—CO—$X^2$-$L^{2\prime}$, SO—$X^2$-$L^{2\prime}$ and $SO_2$—$X^2$-$L^{2\prime}$.

Halogen is fluorine, chlorine, bromine or iodine, in particular fluorine or chlorine.

The variables $X^1$ and $X^2$ are each independently oxygen, sulfur or $NL^{1\prime}$ or $NL^{2\prime}$.

In the $L^1$ and/or $L^2$ radicals, the hydrogen atoms bonded to carbon atoms may be substituted partly or fully by halogen atoms. Possible halogen atoms here are chlorine atoms and in particular fluorine atoms.

Among the compounds of the formula I, preference is given in particular to those of the structure

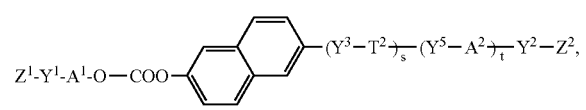

i.e. the variable r in formula I assumes the value of 0. In addition, the hydrogen atoms in the 2,6-naphthyl radical may be substituted partly or fully by halogen atoms, for instance chlorine atoms or in particular fluorine atoms.

Further preferred inventive compounds are those in which $(Y^3$-$T^2$-$)_s$ in formula I corresponds to a moiety of the formula Ia

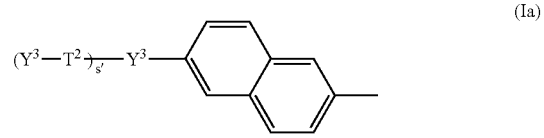

(Ia)

where s' assumes values of 0, 1 or 2, and the variables $Y^3$ when s'>0 and the variables $T^2$ when s'>1 may be the same as one another or different from one another.

These preferred compounds thus correspond to the formulae shown below

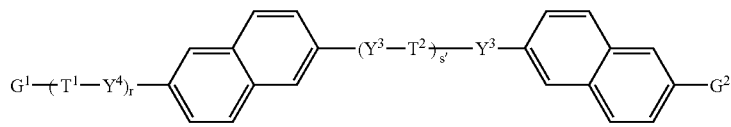

and (when r equals 0)

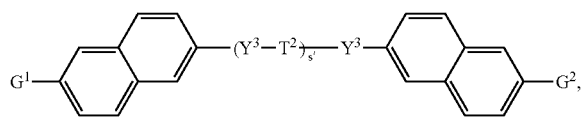

where $G^1$ and $G^2$ are the moieties $Z^1$-$Y^1$-$A^1$-O—COO— or —$(Y^5$-$A^2$-$)_t Y^2$-$Z^2$, and the hydrogen atoms in the two 2,6-naphthyl radicals may be substituted partly or fully by halogen atoms, for instance chlorine atoms or in particular fluorine atoms.

Particular preference is given to compounds of the formula I and of the formulae shown above, in which t assumes a value of 1 and $Y^5$ corresponds to an —O—COO— group.

Very particular preference is given to polymerizable liquid-crystalline compounds and to their preferred embodiments in which t assumes a value of 1 and the $Z^1$-$Y^1$-$A^1$- and -$A^2$-$Y^2$-$Z^2$ moieties are the same.

Advantageous inventive compounds correspond to the formula I' shown below

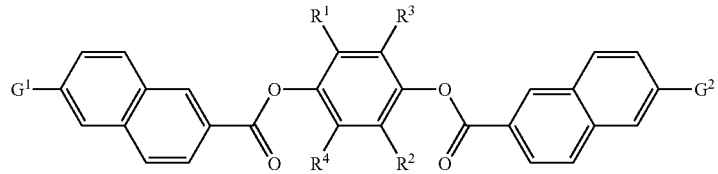

in which $G^1$ and $G^{2\prime}$ are a $Z^1$-$Y^1$-$A^1$-O—COO— or —COO—O-$A^2$-$Y^2$-$Z^2$ moiety (t assumes a value of 1), and $R^1$ to $R^4$ are each independently hydrogen or substituents selected from the group consisting of halogen, $NO_2$, CN, CHO, $L^1$, CO-$L^1$, $X^1$—CO-$L^1$, $X^1$-$L^{1\prime}$ and CO—$X^1$-$L^{1\prime}$, where $L^1$ is $C_1$-$C_{20}$-alkyl, $L^{1\prime}$ is hydrogen or $C_1$-$C_{20}$-alkyl, and $X^1$ is oxygen or $NL^{1\prime}$.

In particularly advantageous compounds of the formula I' show above, the $G^1$ and $G^2$ moieties are the same.

In further particularly advantageous compounds of the formula I' shown above, either the two substituents $R^1$ and $R^3$ or the two substituents $R^4$ and $R^2$ are each hydrogen.

In further particularly advantageous compounds of the formula I' shown above, at least one of the two substituents $R^1$ or $R^3$ is halogen, $NO_2$, CN, CHO, $L^1$, CO-$L^1$, $X^1$—CO-$L^1$, $X^1$-$L^{1\prime}$ or CO—$X^1$-$L^{1\prime}$, and the two substituents $R^4$ and $R^2$, and also, if appropriate, one of the substituents $R^1$ or $R^3$, are each hydrogen, where $L^1$ is $C_1$-$C_{20}$-alkyl, $L^{1\prime}$ is hydrogen or $C_1$-$C_{20}$-alkyl, and $X^1$ is oxygen or $NL^{1\prime}$.

In further particularly advantageous compounds of the formula I' shown above, at least one of the two substituents $R^1$ or $R^3$ is $L^1$, CO-$L^1$, $X^1$—CO-$L^1$, $X^1$-$L^1$ or CO—$X^1$-$L^{1\prime}$, and the two substituents $R^4$ and $R^2$, and also, if appropriate, one of the substituents $R^1$ and $R^3$, are each hydrogen, where $L^1$ is $C_1$-$C_{20}$-alkyl, $L^{1\prime}$ is hydrogen or $C_1$-$C_{20}$-alkyl, and $X^1$ is oxygen or $NL^{1\prime}$.

In further particularly advantageous compounds of the formula shown above, at least one of the two substituents $R^1$ or $R^3$ is $L^1$, $X^1$-$L^1$ or CO—$X^1$-$L^1$, and the two substituents $R^4$ and $R^2$, and also, if appropriate, one of the substituents $R^1$ or $R^3$, are each hydrogen, where $L^1$ is $C_1$-$C_{20}$-alkyl and $X^1$ is oxygen.

The present invention further provides a polymerizable or nonpolymerizable liquid-crystalline composition which comprises, as components, from 10 to 100% by weight of the inventive compounds of the formula I or their preferred embodiments, from 0 to 90% by weight of further monomers, from 0 to 50% by weight of one or more chiral compounds and from 0 to 90% by weight of further additives, the sum of the proportions of the components adding up to 100% by weight.

A polymerizable or nonpolymerizable inventive liquid-crystalline composition should be understood quite generally not just to mean a composition whose one or more components already per se (in the temperature range of interest) have liquid-crystalline properties; instead, this should also be understood to mean a composition which only has liquid-crystalline behavior by virtue of mixing of the constituents or else only by addition of the inventive compounds (for example lyotropic systems). Moreover, the inventive compounds of the formula I and their preferred embodiments may already themselves have liquid-crystalline behavior, but need not necessarily possess this property.

A nonpolymerizable inventive composition is in particular a composition which is not capable of forming self-supporting polymerization or condensation products. This composition can be prepared, for example, by mixing suitable, commercially available liquid-crystalline materials, as find use, for example, for active LC layers in display technology, with one or more of the inventive compounds of the formula I or of the preferred embodiments. When the latter are compounds which comprise one or two reactive radicals $Z^1$ and $Z^2$, they are present in the inventive compositions in a concentration such as to be insufficient for generating correspondingly densely crosslinked self-supporting polymerization or condensation products.

A polymerizable inventive composition is in particular a composition in which at least one of the components is capable under customary polymerization conditions of forming polymerization or condensation products and which is polymerizable as such and can be polymerized or condensed to form self-supporting products.

Depending on the number of reactive radicals in the components of the polymerizable liquid-crystalline composition, the desired degree of polymerization, crosslinking and/or condensation on completion of polymerization or condensation can be established. This composition can be prepared readily by mixing suitable materials with one or more of the inventive compounds, these materials themselves being polymerizable or nonpolymerizable, liquid-crystalline or else non-liquid-crystalline. Suitable polymerizable, liquid-crystalline materials are compounds which are described, for example, in the WO documents 95/22586 A1, 95/24454 A1, 95/24455 A1, 96/04351 A1, 96/24647 A1, 97/00600 A2, 97/34862 A1 and 98/47979 A1, and also the documents EP 1 134 270 A1 and DE 198 35 730 A1, and correspond substantially to the schematic structure P—Y-A-Y-M-Y-A-Y—P in which the variables P, Y and A are defined analogously to the variables $Z^1$ and $Z^2$, $Y^1$ to $Y^5$ and $A^1$ to $A^2$ in formula I, and M denotes a mesogenic unit.

The reactive compounds which are listed in the document DE 100 25 782 A1 as constituent B) of the liquid-crystalline substance mixture described there may be added to the inventive liquid-crystalline composition as further monomers. These usually inexpensive compounds themselves generally do not exhibit liquid-crystalline behavior, but their addition opens up the possibility of reducing the proportion of expensive components in the inventive composition without noticeably influencing their liquid-crystalline behavior. In addition, it is possible with the aid of such reactive monomers to adjust, in a controlled manner, properties of the composition such as degree of crosslinking, viscosity, elasticity, etc. The selection of suitable reactive monomers can be accomplished by those skilled in the art, if appropriate after carrying out preliminary experiments. It should be noted here that such reactive compounds can also act as (auxiliary) compounds in the sense discussed above.

Depending on the intended use of the inventive liquid-crystalline composition, this may also comprise at least one chiral compound. Its addition affords a chiral nematic or cholesteric liquid-crystalline composition which possesses particular optical properties, for instance color effects dependent on the viewing angle, reflection in the IR or UV wavelength range of the spectral region, etc.

Preferred chiral compounds correspond here to the general formulae (P—Y—)$_p$X, (P—Y-A-Y—)$_p$X and (P—Y-A-Y-M-Y—)$_p$—X, in which the definitions of the variables P, Y and A correspond to those of the variables $Z^1$ and $Z^2$, $Y^1$ to $Y^5$ and $A^1$ and $A^2$ of formula I, M denotes a mesogenic group, p is 1, 2, 3, 4, 5 or 6, and X represents appropriate p-valent chiral radicals, the p moieties bonded to the chiral X radical being the same or different.

Possible X radicals are shown, for example, on pages 5 to 9 of the document WO 95/16007 A1, and mention should be made in particular of the divalent radicals

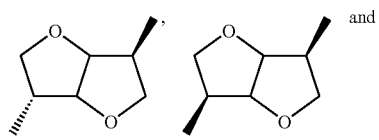

-continued

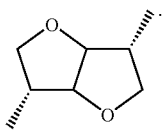

Further chiral compounds which comprise the chiral X radicals mentioned and also others are specified, for example, in the documents EP 0 747 382 A1, EP 0 750 029 A1, EP 1 136 478 A1 and DE 198 43 724 A1.

The inventive liquid-crystalline compound may also comprise further additives. Useful such additives include photoinitiators, diluents, thickeners, defoamers and devolatilizers, lubricating and leveling assistants, thermal-curing or radiative-curing assistants, substrate wetting assistants, wetting and dispersing assistants, hydrophobizing agents, adhesion promoters and assistants for improving scratch resistance, dyes and pigments, and also additives selected from the group of the light, heat and/or oxidation stabilizers. The chemical and physical nature of these additives is addressed in detail in the documents WO 00/47694 A1.

The present invention further provides an oligomer or polymer which is obtainable by oligomerization or polymerization of an inventive polymerizable liquid-crystalline composition. This inventive oligomer or polymer may in particular also be present in the form of a film, i.e. of a self-supporting layer of uniform thickness. This film may be disposed on such a substrate that suitable measures make possible easy removal and transfer to another substrate for permanent disposition. Such a film can be used, for example, in the field of film coating and in laminating processes.

Furthermore, such films, whose properties have been adapted to the particular end use, can be used in a wide variety of fields. For example, they may find use in devices for displaying visual information. Such devices are, for instance, video or overhead projectors, electrophoretic display devices, traffic displays, LCDs for use in computer monitors, televisions, visual display units in printers or kitchen appliances, and also advertising panels, illuminations and information panels, and additionally mobile visual display units, for example visual display units in cellphones, laptops, digital cameras, vehicles and destination displays on buses and trains. They may be present in these devices in a wide variety of functions, for example as color filters or films for the generation of wavelength-selective or broadband-polarized light.

The present invention further provides a process for printing or coating a substrate, which comprises applying an inventive polymerizable liquid-crystalline composition to the substrate and subsequently polymerizing it.

With regard to the procedure for printing or coating substrates with liquid-crystalline materials, reference is made mutatis mutandis to the document WO 96/02597 A2. Furthermore, a polymerized layer which has been produced with the aid of the process according to the invention and partly or fully covers the original substrate surface should also be understood to be a substrate in the context of the application, so that the invention also comprises the production of multiply printed and/or coated substrates.

It should further be noted here that "printing" is typically understood to mean the incomplete coverage of the substrate surface, and "coating" to mean the full coverage of the substrate surface.

Useful substrates in addition to paper and card products, for example for carrier bags, magazines, brochures, gift packaging and packaging materials for consumer goods, consumable goods and luxury goods, are additionally also films, for instance for decorative and nondecorative packaging purposes, and also textiles of any type and leather. In addition, useful substrates are also those materials used to produce banknotes, security papers, entrance tickets, and the like.

Further substrates are also goods for (entertainment) electronics, for example music cassettes (MCs), SVHS and VHS cassettes, minidisks (MDs), compact disks (CDs), digital versatile disks (DVDs) and the corresponding reproduction and/or recording units, televisions, radios, telephones/cellphones, computers, etc, and goods from the leisure, sports, domestic and games sector, for instance bicycles, children's vehicles, skis, snowboards and surfboards, inline skates, roller skates and ice skates and also domestic appliances. In addition, such substrates should also be understood to mean, for example, writing utensils and spectacle frames.

Further substrates are also a wide variety of films which find use in optical or electrooptical components or in their production. Such films consist, for example, of polyvinyl alcohol (PVA), triacetylcellulose (TAC), polyimide (PI), polyvinyl cinnamate (PVC) or polyolefins, for instance polynorbornene, and may, for example, be (broadband) polarizers, light-guiding elements for background illumination in LCDs (known as "light guides"), films for the distribution of light (known as "BEFs", i.e. "brightness enhancement films") and films for the generation of polarized light in LCDs (known as "DBEFs", i.e. "dual brightness enhancement films"). Further substrates in this context may also be certain structural groups of the LCDs, for instance glass or polymer sheets which, if appropriate, also possess a transparent conductive coating, for example of indium tin oxide (ITO).

Light guides or BEFs may, for example, be coated directly with the inventive nematic (i.e. the proportion of chiral compound(s) is 0% by weight) or chiral nematic composition which may then be polymerized. The coating operation may be repeated more or less often with inventive compositions of the same or different composition in order to obtain corresponding optical components, for example retardation films, (broadband) polarizers and optic filters. This allows a correspondingly more compact structure of the optical components in LCDs to be produced.

It is further possible by the process according to the invention to apply a suitable nematic layer as a retardation film to a (broadband) polarizer which provides circular-polarized light. This allows circular-polarized light to be converted to linear-polarized light. The (broadband) polarizer may likewise have been produced from inventive compositions, if appropriate with use of the process according to the invention.

Further substrates are also surfaces to be encountered in the building sector, such as building walls or else windowpanes. In the latter case, a functional effect may also be desired in addition to a decorative effect. Thus, it is possible to obtain multiple layers on the window material whose individual layers possess different chemical and physical properties. When, with addition of one enantiomer of a chiral compound and of the corresponding optical antipode, individual layers of the polymerized liquid-crystalline composition with opposite twisting are applied, or, with addition of different concentrations of chiral compound, individual layers of the polymerized liquid-crystalline composition of the same sense of rotation but in each case different pitch and hence different reflection properties are applied, it is possible in a controlled manner to deflect certain wavelengths or wavelength ranges of the light spectrum. In this way, an IR- or UV-reflective window coating, for example, is possible.

Accordingly, the present invention further provides for the use of the inventive liquid-crystalline composition or of the inventive oligomers or polymers for producing a thermal insulation coating, comprising one or more cholesteric layers which, in the infrared wavelength region, preferably above 750 nm, in particular in the wavelength range from 751 nm to about 2000 nm, reflects at least 40%, in particular at least 45% of the incident radiation.

In particular, the present invention further provides for the use of the inventive liquid-crystalline composition or of the inventive oligomers or polymers for producing a thermal insulation coating, comprising one or more cholesteric layers which, in the infrared wavelength region, preferably above 750 nm, in particular in the wavelength range from 751 nm to about 2000 nm, reflects at least 40%, in particular at least 45% of the incident radiation, and which, in the wavelength range from about 390 nm to 750 nm, has a transmission of at least 80%, in particular at least 90%, of the incident radiation.

The present invention further provides a thermal insulation coating comprising one or more cholesteric layers which, in the infrared wavelength range, preferably above 750 nm, in particular in the wavelength range from 751 nm to about 2000 nm, reflects at least 40%, in particular at least 45% of the incident radiation, and which is obtainable using the inventive liquid-crystalline composition or the inventive oligomers or polymers.

In particular, the present invention further provides a thermal insulation coating comprising one or more cholesteric layers which, in the infrared wavelength range, preferably above 750 nm, in particular in the wavelength range from 751 nm to about 2000 nm, reflects at least 40%, in particular at least 45% of the incident radiation, and which, in the wavelength range from about 390 nm to 750 nm, has a transmission of at least 80%, in particular at least 90%, of the incident radiation, and which is obtainable using the inventive liquid-crystalline composition or the inventive oligomers or polymers.

On this aspect of the inventive liquid-crystalline composition, especially with regard to thermal insulation coatings, reference is made mutatis mutandis also to the documents WO 99/19267 A1.

The present invention further provides for the use of the inventive liquid-crystalline composition or of the inventive oligomer or polymer for producing optical components. Such components include, for example, LCDs and their components, for example (broadband) polarizers, optical filters, retardation films and BEFs.

With regard to the production of such components based on polymerizable liquid-crystalline materials, reference is made mutatis mutandis, for instance, to the document WO 00/37585 A1.

With regard to the use of the inventive polymerizable chiral nematic compositions for producing (broadband) polarizers, reference is made mutatis mutandis, for example, to the documents U.S. Pat. Nos. 6,421,107, 6,417,902, 6,061,108, 6,099,758, 6,016,177, 5,948,831, 5,793,456, 5,691,789 and 5,506,704.

With regard to the use of the inventive polymerizable nematic compositions for producing DBEFs, reference is made mutatis mutandis, for example, to the documents U.S. Pat. Nos. 4,525,413, 5,828,488 and 5,965,247.

The latter two documents describe laminates of polymer layers whose optical properties are such that one layer $S^1$ exhibits either isotropic or anisotropic optical behavior, but the adjacent layer $S^2$ exhibits anisotropic optical behavior differing from $S^1$. The value of the refractive index $n_1^{\,1}$ in one planar direction of $S^1$ corresponds substantially to the refractive index $n_1^{\,2}$ in the same planar direction of $S^2$, but the refractive indices $n_2^{\,1}$ and $n_2^{\,2}$ in the planar direction at right angles in each case of $S^1$ and $S^2$ differ. Light rays which hit these laminates are therefore either transmitted (when $n_1^{\,1}$ and $n_1^{\,2}$ are substantially equal) or reflected (when $n_2^{\,1}$ and $n_2^{\,2}$ are different from one another) depending on their direction of polarization. The anisotropic layers $S^2$ may therefore, in alternation with polymer layers with suitable isotropic or anisotropic refractive index, consist of corresponding polymers or oligomers obtained by polymerization of the inventive polymerizable nematic compositions. Useful polymer layers $S^1$ are also, for example, adhesives which bond the anisotropic layers $S^2$ to one another, or polymer films with suitable glass transition temperature which form the desired laminate together with the layers $S^2$ with suitable thermal treatment. In addition, a polymer layer $S^1$ can be coated with an inventive polymerizable nematic composition, a further polymer layer $S^1$ can be applied and then the composition disposed between the two polymer layers $S^1$ can be polymerized. Irrespective of the procedure selected for the production of such laminates, sufficiently good adhesion of the layers $S^1$ and $S^2$ to one another of course has to be ensured.

The inventive liquid-crystalline composition can also be used as a disperse liquid-crystalline phase in polymer dispersed liquid crystals (PDLCs). Such PDLCs may in principle either have an isotropic polymer matrix and both a macroscopic isotropic and anisotropic disperse liquid-crystalline phase, or an anisotropic polymer matrix and both a macroscopic isotropic and anisotropic dispersed liquid-crystalline phase, the macroscopic isotropic phase resulting from the random distribution of microscopic anisotropic domains.

In general, such PDLCs are prepared starting from a (generally optically anisotropic) polymer film in which the liquid-crystalline phase is present uniformly dispersed in the form of ultrafine inclusions, typically in the micrometer or submicrometer size range. Stretching of the polymer film imposes anisotropic optical behavior both on the polymer matrix and on the dispersed phase. When inventive polymerizable liquid-crystalline compositions find use, the anisotropic state of the dispersed phase can be frozen by polymerization and hence, for example, distinctly better temperature (change) stability can be achieved. The polymer matrix used here is usually polyvinyl alcohol. In addition, the inventive polymerizable chiral nematic composition may, for example, also be used to prepare optical components, as described in the documents U.S. Pat. Nos. 5,235,443 and 5,050,966.

The inventive liquid-crystalline composition may additionally also find use as a liquid-crystalline colorant or for producing liquid-crystalline colorants. The use as colorants is possible when the composition is already colored per se. This color may be based on interference effects of the chiral nematic phase present and/or on absorption effects of dyes and/or pigments present. In addition, the composition, irrespective of whether it is colored or not, may also serve for the preparation of colorants. With regard to the preparation of liquid-crystalline colorants and their use for printing or coating substrates, reference is made mutatis mutandis to the document WO 96/02597 A2.

The inventive composition may additionally find use in the preparation of dispersions and emulsions which are preferably based on water. For the preparation of such dispersions and emulsions using liquid-crystalline materials, reference is made in this context to WO documents 96/02597 A2 and 98/47979 A1. These dispersions and emulsions may likewise be used for printing and coating substrates as have already been described above by way of example.

The inventive composition may further also find use in the preparation of pigments. The preparation of such pigments is known and is described, for example, comprehensively in the document WO 99/11733 A1. In addition, it is also possible to prepare pigments preadjusted in shape and size using printing techniques or with the aid of networks in whose interstices the polymerizable composition is disposed. The subsequent polymerization or condensation of the liquid-crystal composition is followed in this case by the removal or leaching from the substrate or out of the network. These procedures are described in detail in the WO documents 96/02597 A1, 97/27251 A1, 97/27252 A1 and the document EP 0 931 110 A1.

These pigments can have a single layered or have a multi-layered structure. The latter pigments are typically producible only when coating processes are employed in which a plurality of layers one on top of another is obtained successively and finally subjected to mechanical comminution.

For the above-described use of the inventive liquid-crystalline composition as a liquid-crystalline colorant or for preparing liquid-crystalline colorants, preference is given to making use of a polymerizable composition in the preparation of dispersions and emulsions and also in the preparation of pigments.

In the context of the present invention, a process is also claimed for preparing compounds of the formula Ia'

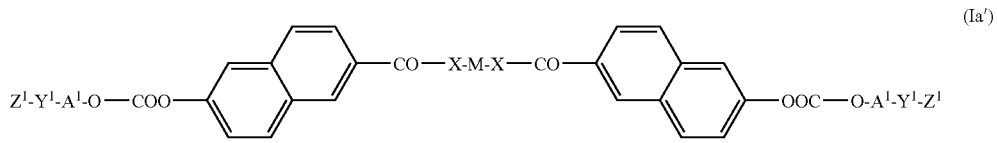
(Ia')

or of the formula Ib'

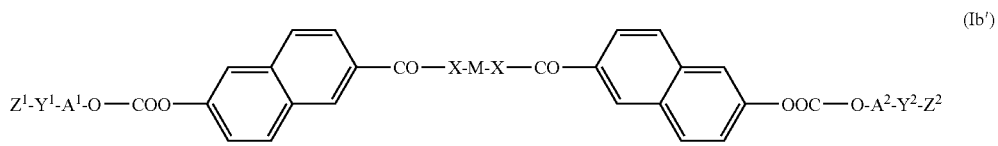
(Ib')

in which M is a moiety of the formula $T^2\text{-}(Y^3\text{-}T^2\text{-})_{s''}$, s'' assumes values of 0 or 1, where the variables $T^2$ when s''>0 may be the same as one another or different from one another, X and X' are each independently oxygen or sulfur, and $T^2$ and $Y^3$ and also the remaining variables are each as defined generally and preferably above, which comprises reacting a compound of the formula II'

HX-M-X'H  II' with the appropriate number of moles of a carboxylic acid derivative of the formula IIIa'

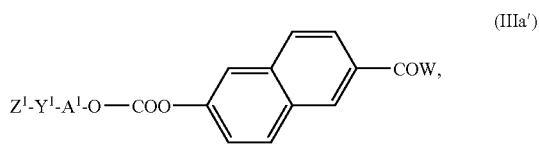
(IIIa')

if appropriate in the presence of one or more auxiliary compounds, to give the symmetrical compound of the formula Ia', or reacting a compound of the formula II', in a first step, with the appropriate number of moles of a carboxylic acid derivative of the formula IIIa', if appropriate in the presence of one or more auxiliary compounds, and, in a second step, with the appropriate number of moles of a carboxylic acid derivative of the formula IIIb'

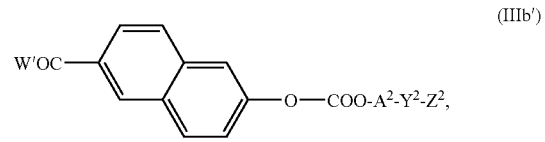
(IIIb')

if appropriate in the presence of one or more auxiliary compounds, to give the unsymmetrical compound of the formula Ib', where W and W' are identical or different leaving groups which leave in the reaction or are identical or different precursor groups which can be converted to a leaving group with the auxiliary compound(s) which is/are present if appropriate.

With regard to different methods of ester synthesis and the appropriate synthesis conditions which are useful for the process according to the invention, reference is made to the relevant literature known to those skilled in the art, for example Ullmann's Encyclopedia of Industrial Chemistry, John Wiley and Sons or Advanced Organic Chemistry, M. B. Smith and J. March, 5$^{th}$ Edition, Wiley-Interscience, New York, p. 485-499.

For W and W', possible groups are all those known as such to the person skilled in the art.

In particular, mention should be made here for W and W' of hydroxyl, halogen, for instance fluorine, bromine and in particular chlorine, and also $C_1$-$C_4$-alkoxy, for instance methoxy, ethoxy, n-propoxy, isopropoxy, n-butoxy, sec-butoxy, isobutoxy or tert-butoxy.

Also useful for W and W' are radicals of inorganic acids, such as hydrogensulfate, sulfate, dihydrogenphosphate, hydrogenphosphate or phosphate, radicals of organic acids, such as formate, acetate, trifluoroacetate, and also radicals of aliphatic or aromatic sulfonic acids or partly or fully fluorinated aliphatic or aromatic sulfonic acids. Examples of such aliphatic or aromatic sulfonic acid radicals are, for instance, $H_3C-SO_2-O$, $F_3C-SO_2-O$, $F_3C-CH_2-SO_2-O$, $F_9C_4-SO_2-O$,

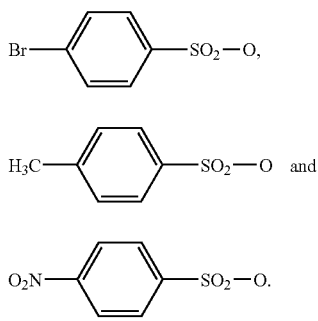

In that case, the compounds of the formulae IIIa' and IIIb' are the corresponding mixed anhydrides.

To synthesis the compounds of the formula Ia', it is also possible to start from compounds of the formula IIIa' in which W corresponds to a group

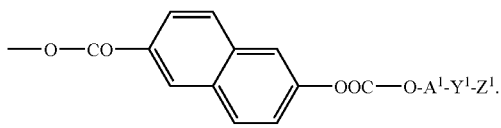

In that case, the compound of the formula IIIa' is the corresponding acid anhydride of the formula

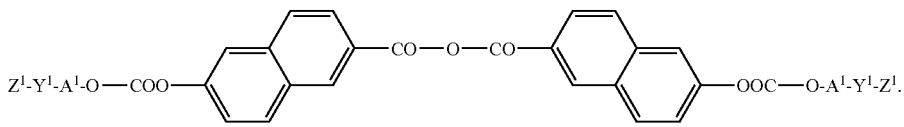

In an analogous manner, the compounds of the formula Ib' can also be synthesized by starting from compounds of the formula IIIb' in which W' is a group

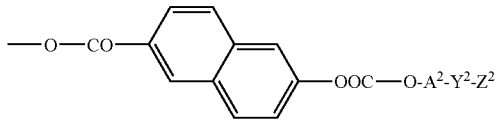

In that case, the compound of the formula IIIb' is quite analogously the corresponding acid anhydride of the formula

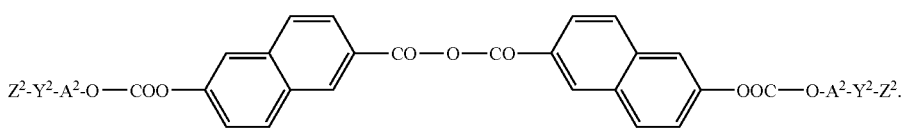

The auxiliary compounds used may, for instance, be dilute or concentrated inorganic acids, for example sulfuric acid, phosphoric acid or hydrochloric acid, dilute or concentrated organic acids, for example formic acid, acetic acid, trifluoroacetic acid, dilute or concentrated, aliphatic or aromatic sulfonic acids, dilute or concentrated, partly fluorinated aliphatic or aromatic sulfonic acids, or dilute or concentrated, fully fluorinated aliphatic or aromatic sulfonic acids.

As such aliphatic or aromatic sulfonic acids, mention should be made in particular of $H_3C-SO_3H$, $F_3C-SO_3H$, $F_3C-CH_2-SO_3H$, $F_9C_4-SO_3H$,

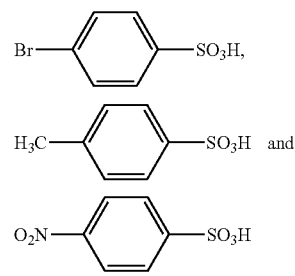

The acids listed above find use as auxiliary compounds especially when W and W' are hydroxyl or $C_1$-$C_4$-alkoxy.

In the case that W and W' are each hydroxyl, mention should be made as further auxiliary compounds of anhydride of organic acids, for example acetic anhydride or trifluoroacetic anhydride, and carbodiimides of the formula

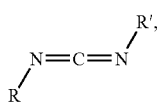

where the variables R and R' are each independently cyclopentyl, cyclohexyl or $C_1$-$C_4$-alkyl which is optionally substituted by hydroxyl, $C_1$-$C_4$-alkoxy, amino, $C_1$-$C_4$-alkylamino or di($C_1$-$C_4$-alkyl)amino. Examples of such carbodiimides are

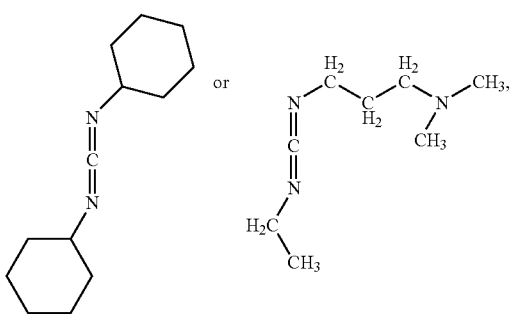

and the latter compound can also be used in the form of its hydrochloride. Often, the carbodiimides are used together with amines, for example N,N-dimethylaminopyridine. Thus, a frequently used assistant in the ester synthesis is dicyclohexylcarbodiimide, shown in the first structure, alone or in combination with N,N-dimethylaminopyridine. The carbodiimides shown above convert the hydroxyl groups of the compounds of the formulae IIIa' and IIIb', for example, to groups of the formulae

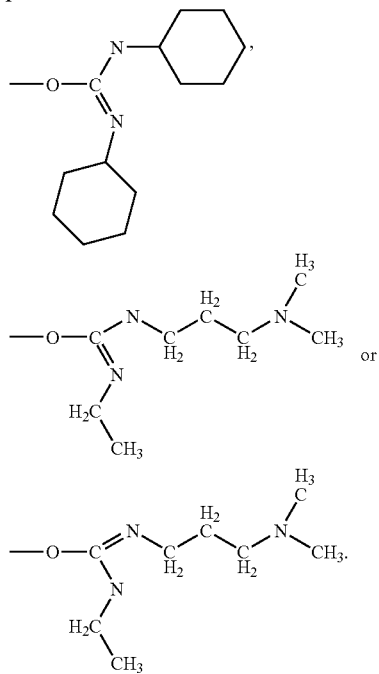

The corresponding intermediate compounds are usually not isolated or they often cannot be isolated since they react rapidly with the other reactants in the reaction mixture.

In the case that W and W' are each hydroxyl, further auxiliary compounds are also dialkyl azodicarboxylates in combination with triarylphosphine, for example diethyl azodicarboxylate/triphenylphosphine, N,N'-carbonyldiimidazole, aliphatic or aromatic sulfonyl chlorides in combination with a tertiary amine, for example methanesulfonyl chloride/triethylamine, chlorosilanes, tetraphosphorus decaoxide or else ion exchangers, for example Amberlyst®-15 (commercially available from Firma Rohm & Haas).

When the compounds of the formulae IIIa' and IIIb' used are the mixed anhydrides addressed above, the reaction with compound II' gives rise to the corresponding acids mentioned above as auxiliary compounds.

Useful further auxiliary compounds include, especially when W and W' are each halogen, preferably chlorine or bromine, also nitrogen-comprising five- or six-membered heteroaromatics, for instance imidazole or pyridine. These hereroaromatics convert the COW or COW' groups of the compounds of the formulae IIIa' and IIIb', for example, to the groups

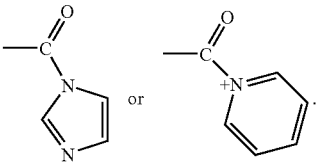

The corresponding intermediate compounds are usually likewise not isolated, or they often cannot be isolated since they react rapidly with the other reactants in the reaction mixture.

The present invention further provides compounds of the formula

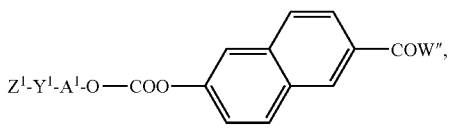

in which W" is hydroxyl, halogen, for example fluorine or chlorine, $C_1$-$C_4$-alkoxy, such as methoxy, ethoxy, propoxy, isopropoxy, butoxy, isobutoxy, sec-butoxy or tert-butoxy, partly or fully halogenated phenoxy, for example 2,4,6-trichlorophenoxy 2,4,6-trifluorophenoxy, pentachlorophenoxy or pentafluorophenoxy, a radical of an inorganic acid, for example hydrogensulfate, sulfate, dihydrogenphosphate, hydrogenphosphate or phosphate, a radical of a carboxylic acid, for example formate, acetate, trifluoroacetate, a radical of an aliphatic or aromatic sulfonic acid, for example $H_3C$—$SO_2$—O,

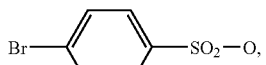

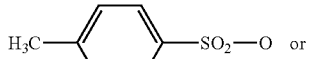

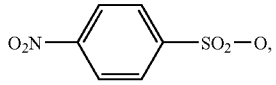

a radical of a partly or fully fluorinated aliphatic or aromatic sulfonic acid, for example $F_3C$—$SO_2$—O, $F_3C$—$CH_2$—$SO_2$—O or $F_9C_4$—$SO_2$—O, or a group of the formula

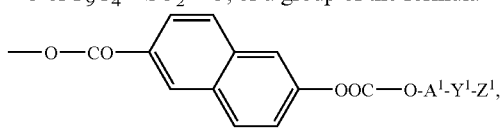

and $Z^1$, $Y^1$ and $A^1$ are each as already defined above.

EXAMPLES

In the syntheses of the inventive compounds and their reactants described below, where they were not commercially available, use was made of general methods of organic synthesis of esters and especially of mono- and difunctional mesogenic compounds, as are known in the relevant scientific and patent literature. In this regard too, reference is made to the works already cited above: Ullmann's Encyclopedia of Industrial Chemistry, John Wiley and Sons and Advanced Organic Chemistry, M. B. Smith and J. March, 5th Edition, Wiley-Interscience, New York, p. 485-499.

variable $Z^1$, the carboxyl group to the variable $Y^1$ and the n-butylene radical —$(CH_2)_4$— to the variable $A^1$ according to the terminology of the formula Ia' specified above. The defi-

Synthesis of the Inventive Compounds

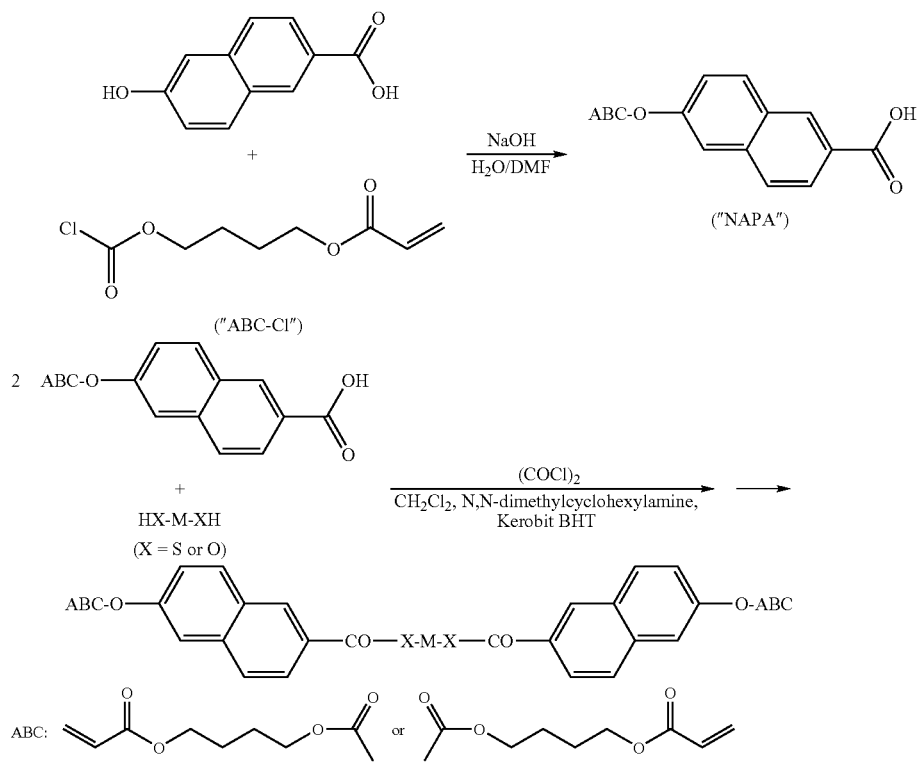

I. Preparation of Inventive Compounds of the General Formula nition of the variables X and M and the moiety X-M-X in the synthesized compounds is listed in the table which follows.

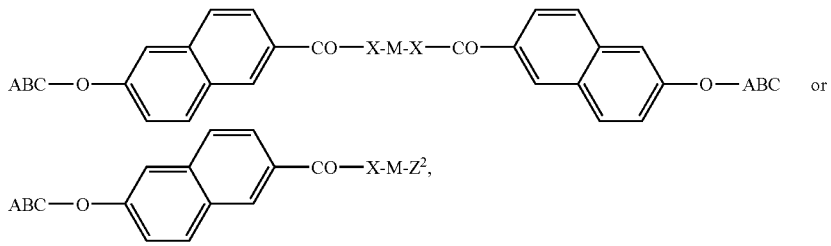

in which X-M-X and X-M-$Z^2$ are each as defined in the Table A1 which follows.

It should additionally be pointed out here that, as a result of the preparation, a portion of the acrylate groups both in the compound ABC-Cl and in the moiety ABC of the intermediate NAPA is present in the form of their HCl adducts. In the last synthesis step of the above scheme A, there is, however, elimination of HCl with reformation of the acrylate group (cf. on this subject also Example 6a on page 66 of WO 98/47979 A1).

In the moiety ABC ("Acryloyloxy-Butyl-Chloroformate"), the vinyl group of the acrylate radical corresponds to the

TABLE A1

| Compound (reactant HX-M-XH) | X-M-X | Yield (% of theory) |
|---|---|---|
| 1 (1E commercially available) | O—⌬—S | 80 |

TABLE A1-continued

| Compound (reactant HX-M-XH) | X-M-X | Yield (% of theory) |
|---|---|---|
| 2 (2E commercially available) | O–[pyridazine]–O (N=N) | 79 |
| 3 (3E commercially available) | O–[cyclohexane]–O | 12 |
| 6 (6E commercially available) | O–[biphenyl]–O | 92 |
| 7 (7E commercially available) | O–[benzophenone]–O | 52 |
| 8 (8E commercially available) | O–[diphenyl sulfide]–O | 84 |
| 9 (9E commercially available) | [1,3,4-thiadiazole-2,5-dithiol] | 22 |

TABLE A1-continued

| Compound (reactant HX-M-XH) | X-M-X | Yield (% of theory) |
|---|---|---|
| Compound (reactant HX-M-Z² where Z² = CN) | X-M-Z² | Yield (% of theory) |
| 10 (10E commercially available) | O–[biphenyl]–CN | 75 |

General Synthesis Method

A) Preparation of 6-(4-acryloyloxybutoxycarbonyloxy)-2-naphthoic acid

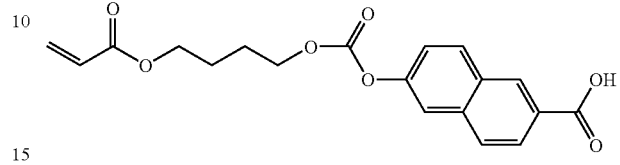

The pH of a solution of 100 g (0.53 mol) of 6-hydroxy-2-naphthoic acid in a solvent mixture of 600 ml of water and 500 ml of DMF was adjusted to 10 with 10 percent sodium hydroxide solution at 0° C. 132 g (0.61 mol) of 4-acryloyloxybutyl chloroformate (prepared according to WO 97/00600 A2) was subsequently added dropwise over a period of 2 h, in the course of which the temperature was kept between 0 and 5° C. and the pH at 10 (±0.2 pH unit) by means of 10 percent sodium hydroxide solution. The resulting solution was subsequently diluted with 3 l of water/ice mixture and the pH was adjusted to 5 with concentrated hydrochloric acid. The resulting suspension was filtered, the resulting filtercake was washed with 3 l of water and, after drying, 165.8 g (87% of theory based on the pure acrylate derivative) of a beige-colored powder were obtained, which comprises the compound NAPA shown above and the corresponding acrylate/HCl adduct.

B) Preparation of Compounds of the Formula

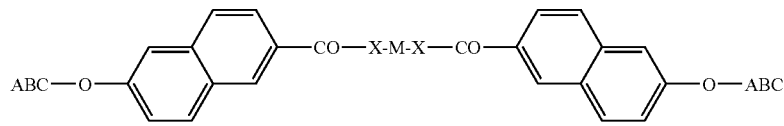

65.2 g (168 mmol), or 32,6 g (84 mmol) in the case of compound 10, of NAPA and a small amount of Kerobit® BHT (0.14 g) were initially charged in 350 ml of oxalyl chloride and admixed slowly with 5 drops of dimethylformamide (DMF). The reaction mixture was subsequently stirred at room temperature for one hour, then the excess oxalyl chloride was removed under reduced pressure and the residue was dried under high vacuum. The yellowish rubberlike product was dissolved in 100 ml of $CH_2Cl_2$, added dropwise at −10° C. with nitrogen purging to a solution of 70 mmol of the particular compound HX-M-XH (Table A1; reactants 1E to 3E and 6E to 9E) or 70 mmol of the compound HX-M-Z² (Table A1; reactant 10 E), 0.03 g of Kerobit® BHT and 53.4 g (420 mmol) of N,N-dimethylcyclohexylamine in 200 ml of $CH_2Cl_2$, and the resulting reaction mixture was subsequently stirred first at room temperature for 12 h and then at 45° C. for 5 h. Afterward, 200 ml of distilled water and 15.2 g of concentrated aqueous hydrochloric acid were added and the phases were separate. The organic phase was washed twice with 200 ml each time of saturated aqueous sodium chloride solution, dried over anhydrous sodium sulfate and concentrated under reduced pressure. The resulting residue (generally a brown oil) could generally be purified by grinding or suspending in methanol or ethanol, by column chromatography (using SiO$_2$, typically as the eluent: 10:1 toluene/acetone), by precipitation from a solution in CH$_2$Cl$_2$ by means of n-hexane or methanol, or a combination of these steps. The particular product was obtained as a white to grey-white powder.

Yield and purification of the particular compound are listed in the above Table A1.

II. Preparation of Inventive Compounds of the General Formula

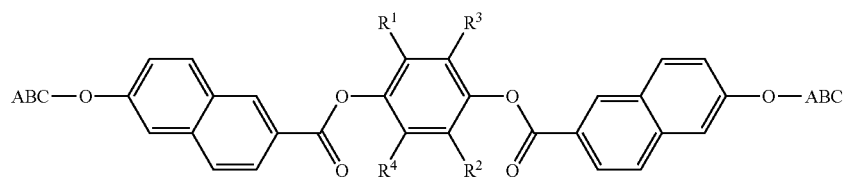

As above, ABC corresponds to the acryloyloxybutoxycarbonyl moiety; the variables $R^1$, $R^2$, $R^3$ and $R^4$ are each as defined in Table A2.

TABLE A2

| Compound | $R^1$ | $R^2$ | $R^3$ | $R^4$ | Yield (% of theory) |
|---|---|---|---|---|---|
| 14 | Et | H | H | H | 85 |
| 15 | n-propyl | H | H | H | 84 |
| 16 | n-butyl | H | H | H | 55 |
| 17 | n-hexyl | H | H | H | 65 |
| 18 | n-octyl | H | H | H | 12 |
| 20 | methyl | methyl | methyl | H | 68 |
| 21 | methyl | methyl | methyl | methyl | 18 |
| 22 | isopentyl | H | H | H | 30 |
| 23 | COOethyl | COOethyl | H | H | 18 |
| 24 | tert-butyl | H | H | H | 26 |
| 25 | F | F | F | F | 15 |
| 26 | C(O)ethyl | H | H | H | 61 |
| 27 | C(O)methyl | H | H | H | 79 |
| 28 | Omethyl | H | H | H | 20 |
| 29 | Cl | Cl | H | H | 48 |
| 30 | methyl | H | methyl | H | 23 |
| 31 | CN | H | CN | H | 83 |
| 32 | n-octyl | n-octyl | H | H | 35 |
| 33 | COOmethyl | H | H | H | 85 |
| 34 | COOethyl | H | H | H | 97 |
| 35 | COOn-propyl | H | H | H | 84 |
| 36 | COOn-butyl | H | H | H | 68 |
| 37 | COOn-hexyl | H | H | H | 84 |
| 38 | Cl | H | H | H | — |

A) Availability of the Reactants HX-M-XH

TABLE A3

| Reactant HX-M-XH | X-M-X |
|---|---|
| 12E commercially available | O—⟨phenyl⟩—O |
| 14E | H$_5$C$_2$ substituted phenyl with O—...—O |
| 15E | H$_5$C$_2$ substituted phenyl with O—...—O |
| 16E | H$_5$C$_2$ substituted phenyl with O—...—O |
| 17E | H$_5$C$_2$ substituted phenyl with O—...—O |
| 18E | H$_5$C$_2$ substituted phenyl with O—...—O |
| 20E commercially available | H$_3$C, CH$_3$, CH$_3$ substituted phenyl with O—...—O |

TABLE A3-continued
| Reactant HX-M-XH | X-M-X |
|---|---|
| 21E commercially available | 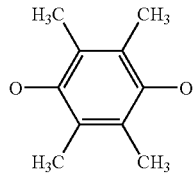 |
| 22E | 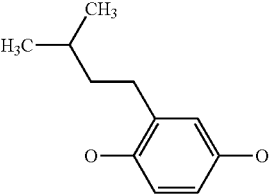 |
| 23E | 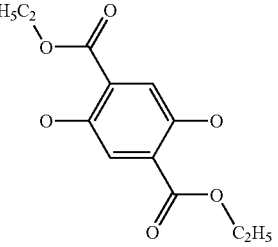 |
| 24E commercially available | 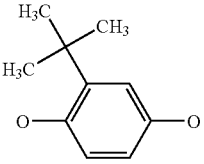 |
| 25E commercially available | 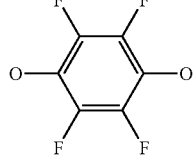 |
| 26E commercially available | 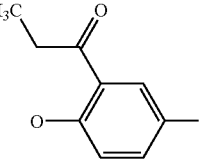 |
| 27E commercially available | 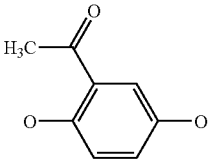 |
| 28E commercially available | 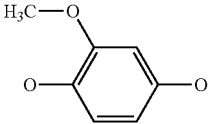 |
| 29E commercially available | 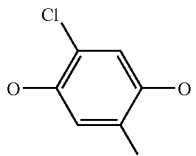 |
| 30E commercially available | 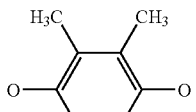 |
| 31E commercially available | 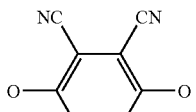 |
| 32E | 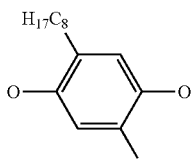 |
| 33E commercially available | 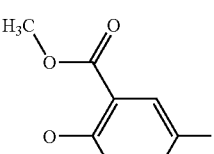 |
| 34E | 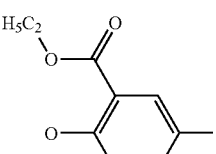 |
| 35E | 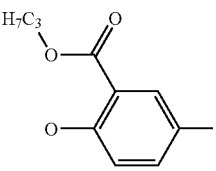 |
| 36E | 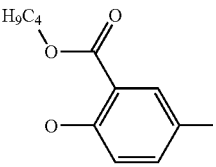 |
| 37E | 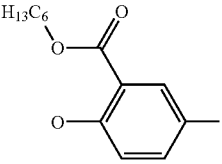 |

TABLE A3-continued

| Reactant HX-M-XH | X-M-X |
|---|---|
| 38E commercially available | 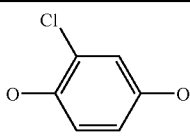 |

Preparation of Reactant 14E

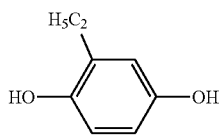
(14E)

158.4 g (2.4 mol) of potassium hydroxide were added to 600 ml of triethylene glycol and the resulting suspension was heated to 80° C. 93.1 g (0.6 mol) of 2,5-dihydroxyacetophenone and 90.1 g (1.8 mol) of hydrazine hydrate were added, and the resulting solution was kept under reflux (approx. 140° C.) for a period of 1.5 h. After the volatile constituents had been distilled off between 140 and 190° C., the mixture was kept at a temperature of 190° C. for 4 h. Subsequently, 600 ml of water were added, the pH was adjusted to from 2 to 3 with concentrated hydrochloric acid, and the aqueous phase was extracted eight times with 200 ml each time of tert-butyl methyl ether. The organic phases were combined, washed four times with 200 ml each time of water, dried over anhydrous sodium sulfate and concentrated under reduced pressure. During the stirring of the resulting brown oil with n-hexane, crystallization took place. After filtration, 67.7 g (0.49 mmol, 82% of theory) of the desired product 14E were obtained as a slightly brownish solid.

Preparation of Reactant 15E

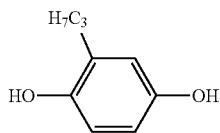
(15E)

16.0 g (250.9 mmol) of potassium hydroxide were added to 350 ml of triethylene glycol and the resulting suspension was heated to 80° C. Subsequently, 10 g (60.2 mmol) of 2,5-dihydroxypropiophenone and 10 g (199.2 mmol) of hydrazine hydrate were added and the solution was heated under reflux (approx. 140° C.) for 2 h. After the volatile constituents had been distilled off between 140 and 195° C., the mixture was kept at 195° C. for 4 h. Subsequently, 400 ml of water were added, the pH was adjusted to from approx. 2 to 3 with concentrated hydrochloric acid, and the aqueous phase was extracted three times with 200 ml each time of tert-butyl methyl ether. The organic phases were combined, dried over anhydrous magnesium sulfate and concentrated under reduced pressure. The resulting oil was dissolved in $CH_2Cl_2$ and n-hexane was added slowly in order to precipitate the product. After filtration, 6.4 g (41.2 mmol, 69% of theory) of the desired product 15E were obtained as a grey solid.

Preparation of Reactants 16E to 18E and 22E

TABLE A4

| Reactant HX-M-XH | R | Yield (in % of theory) |
|---|---|---|
| 16E | n-butyl | 50 |
| 17E | n-hexyl | 22 |
| 18E | n-octyl | 45 |
| 22E | 3-methylpentyl | 54 |

General Synthesis Method

A mixture of 0.05 mol of cyclohexane-1,4-dione, 0.05 mol of aldehyde RCHO and 0.05 mol of lithium chloride in 100 ml of pyridine was heated to 115° C. for 4 h. The majority of the pyridine was subsequently distilled off, the residue was poured into 200 ml of water and the pH was adjusted to 2 with concentrated hydrochloric acid. The resulting solution was extracted twice with 200 ml each time of diethyl ether, and the combined organic phases were dried over anhydrous sodium sulfate and subsequently concentrated under reduced pressure. The brown oily residue was stirred with n-hexane overnight and the resulting solid was filtered off. The corresponding crude products were obtained as brownish powders and were used without further purification for the subsequent reactions.

Preparation of Reactant 32E

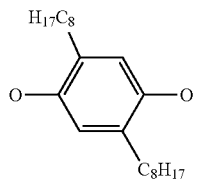

The preparation was effected according to Z. Bao et al., J. Amer. Chem. Soc. 1995, 117, 12426-12435.

Preparation of Reactants 34E to 37E

TABLE A5

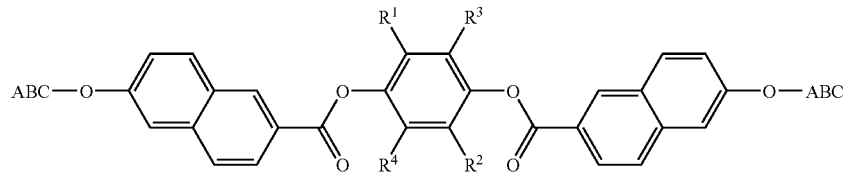

| Reactant HX-M-XH | R | Yield (in % of theory) | Synthesis method |
|---|---|---|---|
| 34E | ethyl | 93 | A |
| 35E | n-propyl | 65 | A |
| 36E | n-butyl | 74 | B |
| 37E | n-hexyl | 82 | B |

Synthesis Method A:

A mixture of 15 g (97.3 mmol) of 2,5-dihydroxybenzoic acid and 4 ml of concentrated sulfuric acid in 300 ml of alcohol (ethanol for 34E and n-propanol for 35E) was heated under reflux. After a reaction time of 24 hours, 2 ml of concentrated sulfuric acid were added and the mixture was kept under reflux for a further 24 h. After cooling to room temperature, 300 ml of water were added to the reaction mixture, whereupon the product was obtained as an oil. After further stirring (generally after approx. one hour), the product crystallized out and was obtained after being filtered off as a white powder.

Synthesis Method B:

A mixture of 3.1 g (20 mmol) of 2,5-dihydroxybenzoic acid and 5 g (59 mmol) of sodium bicarbonate in 30 ml of DMF was stirred under nitrogen at 70° C. for 1 h. 20 mmol of the corresponding bromoalkane R—Br were added and the suspension was stirred at 70° C. for a further 7 h. The reaction mixture was poured onto 100 ml of water and the resulting aqueous phase was extracted with 60 ml of a 1:1 mixture of n-hexane and ethyl acetate. The organic phase was washed three times with 50 ml each time of water, 3 g of $Al_2O_3$ (3 g) were added and the mixture was filtered. The mother liquor was concentrated under reduced pressure and the resulting product was obtained as a white to grey-white solid.

The yields obtained for the particular compounds by synthesis method A and B are listed in the Table A5 above.

Preparation of Reactant 23E

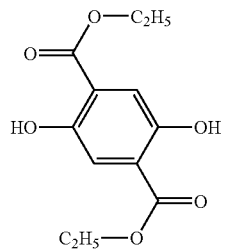

(23E)

A solution of 2.0 g (10.0 mmol) of 2,5-dihydroxyterephthalic acid and 2 ml of concentrated sulfuric acid in 25 ml (0.42 mol) of ethanol was stirred under reflux for 24 h. Subsequently, the reaction mixture was cooled to room temperature and the pH adjusted to 6 with a 5 percent aqueous sodium bicarbonate solution (approx. 80 ml of the solution were required), whereupon a solid precipitated out. This was filtered off dissolved in ethyl acetate, and the resulting organic phase was washed twice with 100 ml each time of water and twice with 100 ml each time of 5 percent aqueous sodium bicarbonate solution, dried over anhydrous sodium sulfate and concentrated around reduced pressure. A brownish residue was obtained, which consisted mainly of compound 23E and was used without further purification for the subsequent reactions.

B) Preparation of Inventive Compounds of the Formula $$ABC—O—\text{[naphthyl]}—C(=O)—O—\text{[benzene with } R^1, R^2, R^3, R^4\text{]}—O—C(=O)—\text{[naphthyl]}—O—ABC$$

65.2 g (168 mmol) of NAPA and a small amount of Kerobite® BHT (0.14 g) were introduced slowly into 350 ml of oxalyl chloride which had been admixed with 5 drops of dimethylformamide (DMF). The reaction mixture was subsequently stirred at room temperature for one hour, the excess oxalyl chloride was then removed under reduced pressure and the residue was dried under high vacuum. The yellowish rubberlike product was dissolved in 100 ml of $CH_2Cl_2$, added at −10° C. with nitrogen purging dropwise to a solution of 70 mmol of the particular compound HX-M-XH (for availability of these compounds see Table A3), 0.03 g of Kerobit® BHT and 53.4 g (420 mmol) of N,N-dimethylcyclohexylamine in 200 ml of $CH_2Cl_2$, and the resulting reaction mixture was subsequently stirred first at room temperature for 12 h and then at 45° C. for 5 h. Afterward, 200 ml of distilled water and 15.2 g of concentrated aqueous hydrochloric acid were added and the phases were separated. The organic phase was washed twice with 200 ml each time of saturated aqueous sodium chloride solution, dried over anhydrous sodium sulfate and concentrated under reduced pressure. The resulting residue (generally a brown oil) could generally be purified by grinding or suspending in methanol or ethanol, by column chromatography (using $SiO_2$, typically as the eluent: 10:1 toluene/acetone), by precipitation from a solution in $CH_2Cl_2$ by means of n-hexane or methanol, or a combination of these steps. The particular product was obtained as a white to grey-white powder.

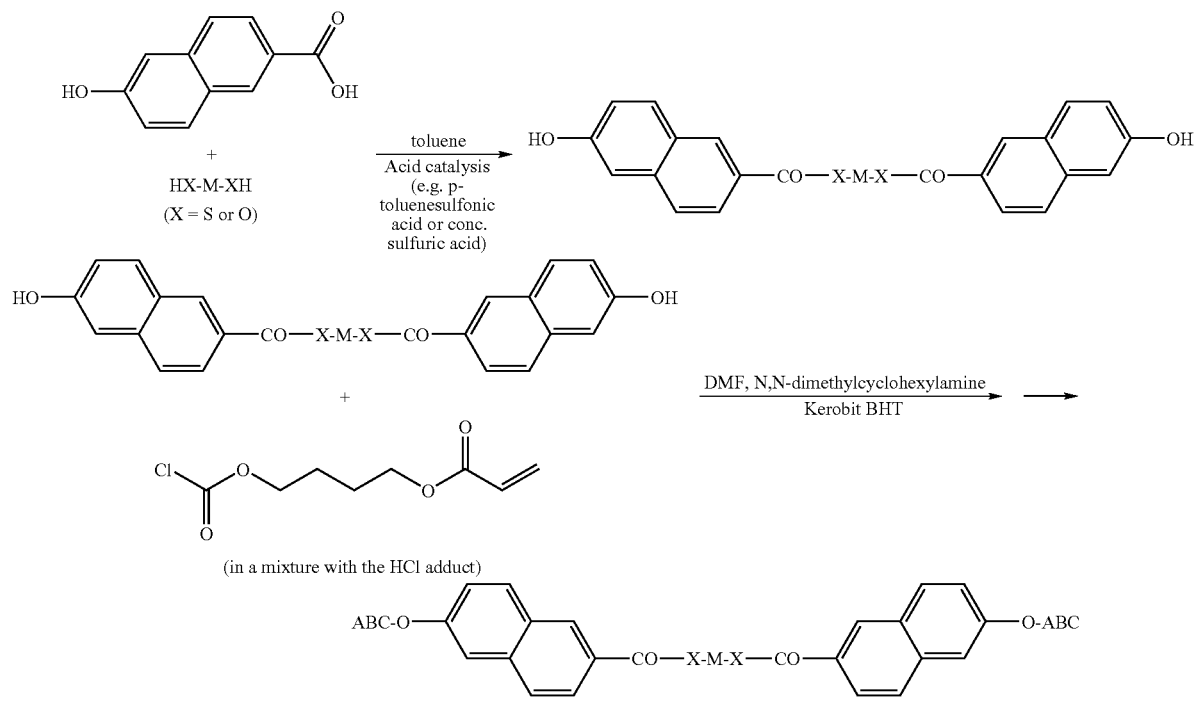

III. Preparation of Inventive Compounds of the General Formula

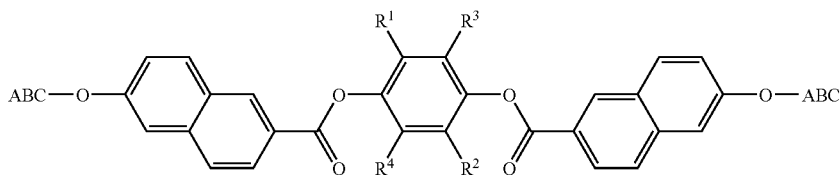

where the moiety

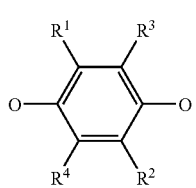

corresponds to the unit X-M-X in scheme B, and the variables $R^1$ to $R^4$ are each as defined in Table B1.

TABLE B1

| Compound | $R^1$ | $R^2$ | $R^3$ | $R^4$ |
|---|---|---|---|---|
| 13 | methyl | H | H | H |
| 19 | methyl | methyl | H | H |
| 21 | methyl | methyl | methyl | methyl |
| 38 | Cl | H | H | H |

A) Availability of the Hydroquinones of the Formula

TABLE B2

| Reactant HX-M-XH | $R^1$ | $R^2$ | $R^3$ | $R^4$ |
|---|---|---|---|---|
| 13E commercially available | methyl | H | H | H |
| 19E | methyl | methyl | H | H |
| 21E | methyl | methyl | methyl | methyl |
| 38E commercially available | | | | |

TABLE B2-continued

HO—[R¹, R³, R², R⁴ benzene]—OH

| Reactant HX-M-XH | R¹ | R² | R³ | R⁴ |
|---|---|---|---|---|
| 38E commercially available | Cl | H | H | H |

Preparation of Reactant 19E

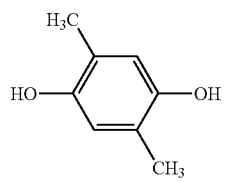

(19E)

A suspension of 75.7 g (0.435 mol) of sodium dithionite in 150 ml of water was added slowly to a solution of 5.0 g of 2,5-dimethyl-p-benzoquinone in 150 ml of diethyl ether. The reaction mixture was stirred vigorously for one hour, in the course of which the color changed from yellow to colorless. Subsequently, 200 ml of water were added until all of the solid had dissolved and the mixture was stirred for a further hour. The phases were separated and the aqueous phase was extracted twice with 100 ml each time of diethyl ether. The combined organic phases were washed with 100 ml of water and 100 ml of concentrated sodium chloride solution, dried over anhydrous magnesium sulfate and concentrated under reduced pressure. The solid residue was suspended in 100 ml of $CH_2Cl_2$, the suspension was stirred for one hour and then the solid was filtered off. 5.1 g of the desired compound 19E were obtained in virtually quantitative yield as a white powder.

B) Preparation of the Dihydroxyl Compounds of the Formula

TABLE B3

HO—naphthyl—C(O)O—[R¹, R³, R⁴, R² benzene]—OC(O)—naphthyl—OH

| R¹ | R² | R³ | R⁴ | Yield (% of theory) |
|---|---|---|---|---|
| methyl | H | H | H | 14 |
| methyl | methyl | H | H | 53 |
| methyl | methyl | methyl | methyl | 84 |
| Cl | H | H | H | 90 |

A mixture of 0.06 mol (11.3 g) of 6-hydroxy-2-naphthoic acid, 0.033 mol of the corresponding hydroquinone derivative HO—[R¹, R³, R⁴, R² benzene]—OH and 4 drops of concentrated sulfuric acid in 40 ml of toluene was heated under reflux under azeotropic distillation conditions (Dean-Stark) for 3 h. After cooling to room temperature, 100 ml of methanol were added and the resulting solution was filtered. The filtercake was washed repeatedly with methanol and subsequently dried. The corresponding compound was obtained as a slightly brownish solid.

C) Preparation of the Inventive Compounds of the Formula

TABLE B4

ABC—O—naphthyl—C(O)O—[R¹, R³, R⁴, R² benzene]—OC(O)—naphthyl—O—ABC

| Compound | Yield (% of theory) |
|---|---|
| 13 | 39 |
| 19 | 85 |
| 21 | 67 |
| 38 | 72 |

22.1 mmol of 4-acryloyloxybutyl chloroformate were added at 0° C. dropwise to a solution of 6.3 mmol of the appropriate dihydroxyl compound prepared under B) and 18.9 mmol of N,N-dimethylcyclohexylamine in 20 ml of DMF, and the mixture was stirred at room temperature for 12 h. Then, another 6.3 mmol of N,N-dimethylcyclohexylamine were added and the reaction mixture was stirred at 40° C. for one further hour. The reaction mixture was poured onto 300 ml of water and the pH was adjusted to 5 with concentrated hydrochloric acid. After stirring for two hours, the suspension was filtered, and the filtercake was washed with water and dried. After purification by column chromatography ($SiO_2$, 20:1 toluene/ethyl acetate), the corresponding compounds were obtained as white solids in the yields specified in the Table.

IV. Preparation of the Inventive Compound 5 of the Formula

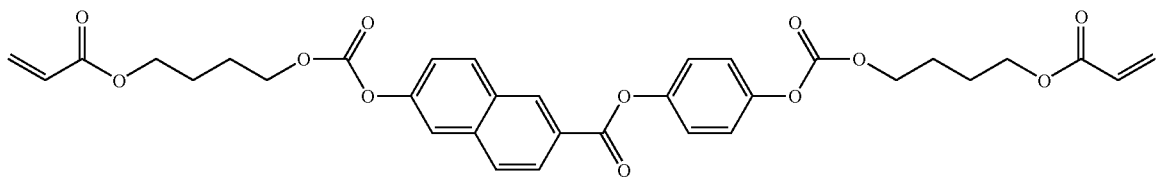

(5)

In the comparison between the general formula and the formula of compound 5 shown above, the vinyl groups of the acrylate radicals correspond to the variables $Z^1$ and $Z^2$, the carboxyl groups of the acrylate radicals to the variables $Y^1$ and $Y^2$, the n-butylene radicals —$(CH_2)_4$— to the variables $A^1$ and $A^2$, and the right-hand carbonate group corresponds to the variable $Y^5$. The variable r in formula I assumes the value of 0 and the variables $Y^3$ and $T^2$ in the moiety $(Y^3\text{-}T^2\text{-})_s$ are defined as a —CO—O— and 1,4-phenylene group respectively, where the variable s assumes a value of 1.

mixture was adjusted to a pH of from 4 to 5 with dilute hydrochloric acid and the resulting aqueous phase was extracted with 400 ml of $CH_2Cl_2$. The organic phase was washed twice with 250 ml each time of water and 200 ml of a saturated sodium chloride solution, dried over anhydrous sodium sulfate and concentrated under reduced pressure. The resulting yellowish powder was suspended in 50 ml of methanol and subsequently filtered off. 7.7 g (62% of theory) of the desired compound 5 were obtained as a white powder.

V. Preparation of the Inventive compound 11 of the Formula

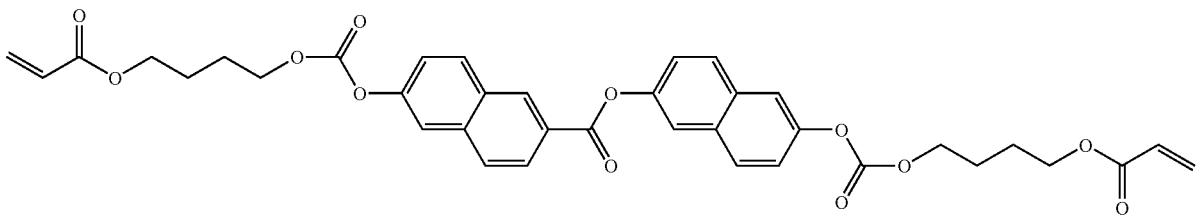

(11)

A) Preparation of the Compound

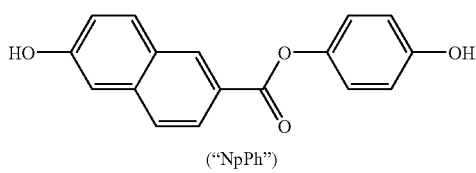

("NpPh")

A mixture of 18.82 g (0.1 mol) of 6-hydroxy-2-naphthoic acid, 33.03 g (0.3 mol) of hydroquinone, 1.6 g of p-toluenesulfonic acid monohydrate and 5 drops of concentrated sulfuric acid in 100 ml toluene was heated under reflux for 3 h. The resulting suspension was cooled to room temperature and filtered. The filtercake was dissolved in methanol and the product precipitated with water. After the filtration and drying, 25.9 g (93% of theory) of the crude product NpPh were obtained as a brown solid. This was used without further purification in the subsequent reaction.

B) Preparation of the Inventive Compound 5

10 g (0.048 mol) of 4-acryloyloxybutyl chloroformate were added at 0° C. dropwise to a solution of 5.6 g (0.02 mol) of NpPh, 7.6 g (0.06 mol) of N,N-dimethylcyclohexylamine and 0.03 g of 4-hydroxy-2,2,6,6-tetramethylpiperidine 1-oxyl (4-hydroxy-TEMPO) in 40 ml of DMF. The reaction mixture was stirred at 0° C. for a further hour and then at 40° C. for another 4 h. After 150 ml of water had been added, the In the comparison between the general formula I and the formula of compound 11, the vinyl groups of the acrylate radicals correspond to the variables $Z^1$ and $Z^2$, the carboxyl groups of the acrylate radicals to the variables $Y^1$ and $Y^2$, the n-butylene radicals $(CH_2)_4$— to the variables $A^1$ and $A^2$, and the right-hand carbonate group corresponds to the variable $Y^5$. The variable r in formula I assumes the value of 0 and the variables $Y^3$ and $T^2$ in the moiety $(Y^3\text{-}T^2\text{-})_s$ are defined as a —CO—O— and 2,6-naphthylene group respectively, where the variable s assumes a value of 1.

A) Preparation of the Compound

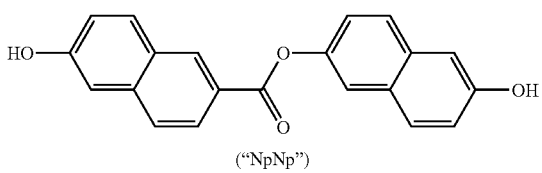

("NpNp")

A mixture of 9.41 g (0.05 mol) of 6-hydroxy-2-naphthoic acid, 24.03 g (0.15 mol) of 2,6-dihydroxynaphthalene, 0.8 g of p-toluenesulfonic acid monohydrate and 3 drops of concentrated sulfuric acid in 100 ml of toluene was heated under reflux with occasional addition of concentrated sulfuric acid (3 drops every 3 h) for 12 h. The resulting suspension was cooled to room temperature and filtered. The filtercake was suspended in methanol, the suspension was stirred for 3 h and the solid was finally filtered off. 10.9 g of 6-hydroxynaphthyl 6-hydroxy-2-naphthoate ("NpNp") were obtained as a brownish solid which was processed in the subsequent step without further purification.

B) Preparation of Inventive Compound 11

10 g (0.048 mol) of 4-acryloyloxybutyl chloroformate were added at 0° C. dropwise to a solution of 6.6 g (20 mmol) of NpNp, 7.6 g (0.06 mol) of N,N-dimethylcyclohexylamine and 0.03 g of 4-hydroxy-TEMPO in 40 ml of DMF. After the reaction mixture had been stirred at this temperature for a further hour, it was allowed to warm slowly to room temperature. After heating at 40° C. for four hours, 150 ml of water were added and the pH was adjusted to from 4 to 5 with concentrated hydrochloric acid. After the resulting mixture had been decanted and the remaining viscous paste had been stirred with 50 ml of methanol overnight, a brown solid was obtained and was purified by column chromatography ($SiO_2$, 10:1 toluene/acetone). 7.7 g (62% of theory) of the desired compound 11 were obtained in the form of a white solid.

Other Syntheses

VI. Preparation of the Inventive Compound 4 of the Formula

A mixture of 8.2 g (25 mmol) of 4-(4-acryloyloxybutoxy-carbonyloxy)benzoic acid (synthesized analogously to the procedures disclosed in the document WO 97/00600 A2 on page 33 under Bb), 5 drops of DMF and a catalytic amount of 4-hydroxy-TEMPO in 60 ml of oxalyl chloride was stirred at room temperature for 1 h. The excess oxalyl chloride was subsequently distilled off under reduced pressure and the residue was dried under high vacuum. The resulting solid was dissolved in 30 ml of $CH_2Cl_2$ and added at 0° C. slowly to a solution of 2.8 g (10 mmol) of NpPh and 3.8 g (30 mmol) of N,N-dimethylcyclohexylamine in 70 ml of $CH_2Cl_2$. The reaction mixture was stirred at room temperature for 14 h and heated at 40° C. for 6 h. Subsequently, 200 ml of methanol were added and the precipitated yellowish-white solid was filtered off. For purification, the suspension of the solid suspended in 50 ml of methanol was stirred for 12 h. After filtering-off and drying, 6.4 g (75% of theory) of the desired compound 4 were obtained as a white solid.

Determination of the Phase Behavior of the Inventive Compounds:

The phase behavior of the inventive compounds in the course of heating and cooling can be taken from the following Table C1. The designation of the phases followed in accordance with the notation used in general (on this subject, cf., for example, Pure Appl. Chem. 2001, 73, 845-895; Ullmann's Encyclopedia of Industrial Chemistry, Sixth Edition, 2000 Electronic Release, Chap 3.1 "Thermotropic Liquid Crystal Polymorphism"; Angew. Chem. 2004, 116, 6340-6368). "K" was selected to designate the crystalline phase; "poly" indicates that polymerization takes place or has taken place. "Δn" designates the anisotropy of the refractive index of the particular nematic compound.

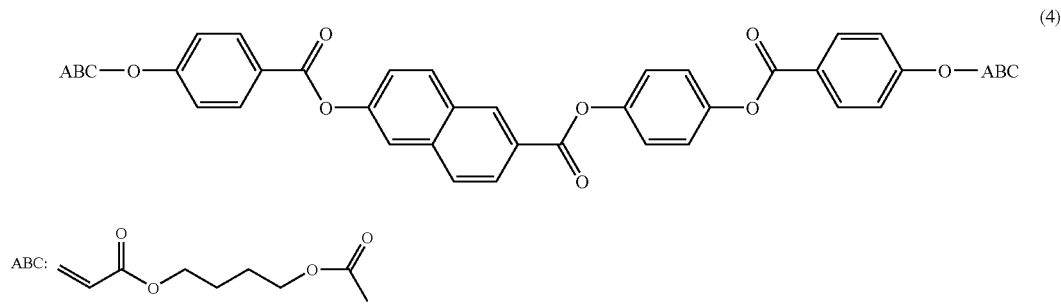

(4)

In the comparison between the general formula I and the formula of compound 4, the vinyl groups of the acrylate radicals correspond to the variables $Z^1$ and $Z^2$, the carboxyl groups of the acrylate radicals to the variables $Y^1$ and $Y^2$, the n-butylene radicals —$(CH_2)_4$— to the variables $A^1$ and $A^2$, and the right-hand carbonate group corresponds to the variable $Y^5$. The variables $T^1$ and $Y^4$ in the moiety $(-T^1-Y^4)_r$ are defined as a 1,4-phenylene and —CO—O— group respectively, where the variable r assumes a value of 1; the variables $Y^3$ and $T^2$ in the moiety $(Y^3-T^2-)_s$ are defined as a —CO—O— and 1,4-phenylene group respectively, where the variable s assumes a value of 2.

The Δn values were, unless stated otherwise, determined at 20° C. by standard processes (for example S. T. Tang, H. S. Kwok, J. App. Phys. 2003, 89, 1, 80 ff and G. Pelzl in "Handbook of Liquid Crystals", Vol 2A, Chap. 2.4 "Optical Properties of Nematic Liquid Crystals", 128-141, 1998, Eds. D. Demus, J. W. Gooby, G. W. Gray, H. W. Spiess, V. Vill, Wiley-VCH and in the publications cited therein).

TABLE C1

| | Phase behavior | | Δn |
|---|---|---|---|
| Compound | Heating | Comment | (20° C.) |
| 1 | K 68 poly | — | — |
| 2 | K 128-131 N 144-150 poly | — | — |
| 3 | K 74-120 I | — | — |
| 5 | K 54-67 N 82-83 I | Compound can be supercooled | 0.16 |
| 6 | K 150 N poly | — | — |
| 7 | poly | — | — |
| 8 | poly | — | — |
| 9 | K 134 poly | — | — |

TABLE C1-continued

| Compound | Phase behavior Heating | Comment | Δn (20° C.) |
|---|---|---|---|
| 10 | K 119-122 N 230 poly | Compound can be supercooled | 0.29 |
| 11 | K 68-77 N 144-150 I | Compound can be supercooled | 0.19 |
| 12 | K 105 N 220 poly | — | — |
| 13 | K 103-105 N poly | — | 0.20 |
| 14 | K 86-87 N 174-179 I | Compound can be supercooled | 0.20 |
| 15 | K 73-76 N 155-158 I | Compound can be supercooled | 0.20 |
| 16 | K 72-76 N 143-147 poly | Compound can be supercooled | 0.19 |
| 17 | K 65-75 N 131-133 poly | Compound can be supercooled | 0.18 |
| 18 | K 53-56 N 108-111 I | Compound can be supercooled | 0.16 |
| 19 | K 118-130 N 180 poly | Compound can be supercooled | — |
| 20 | K 109-112 N 180 poly | Compound can be supercooled | — |
| 21 | K 150-156 N 200 poly | Compound can be supercooled | — |
| 22 | K 78-82 N 139-141 I | Compound can be supercooled | — |
| 23 | K 140-144 I | Monotropic mesophase | — |
| 24 | K 117-118 N 145-149 poly | Compound can be supercooled | — |
| 25 | K 114-122 N poly | — | — |

TABLE C1-continued

| Compound | Phase behavior Heating | Comment | Δn (20° C.) |
|---|---|---|---|
| 26 | K 90 poly | — | — |
| 27 | K 98-102 N 160 poly | Compound can be supercooled | — |
| 28 | K 84-90 N 172-180 I | Compound can be supercooled | 0.18 |
| 29 | K 142 N poly | — | — |
| 30 | Melting point: 93-96° C. clearing point: 113° C. | Compound can be supercooled | — |
| 31 | K 146-161 N poly | — | — |
| 32 | K 65-69 I | — | — |
| 33 | K 106-109 N 130 poly | Compound can be supercooled | 0.21 |
| 34 | K 68-71 N 139 poly | Compound can be supercooled | 0.20 |
| 35 | K 65-78 N 140 poly | Compound can be supercooled | 0.19 |
| 36 | K 56-63 N 155-156 I | Compound can be supercooled | 0.18 |
| 37 | K 58-63 N 120 poly | Compound can be supercooled | 0.18 |
| 38 | K 105 N poly | — | — |

The phase behavior of selected chiral-nematic compositions in the course of heating and cooling can be taken from the Table C2 which follows. The chiral nematic composition (in Table C2, the chiral nematic phase which occurred was designated with "N*") was obtained by mixing 6 mol % of the dopant of the formula (39)

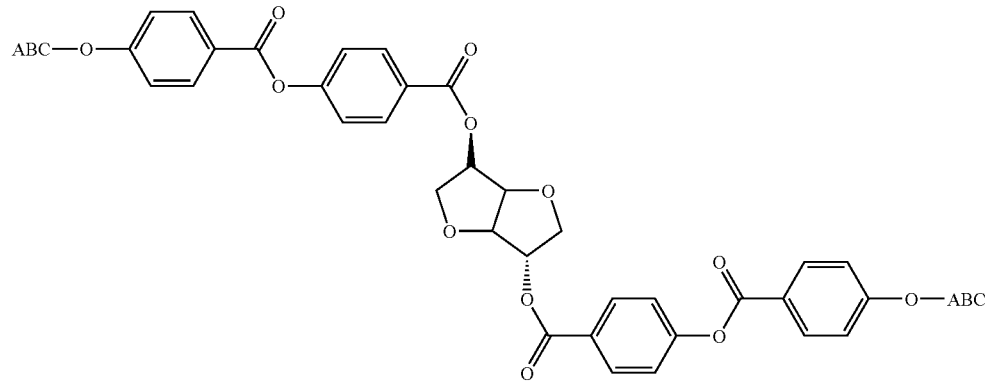

(39)

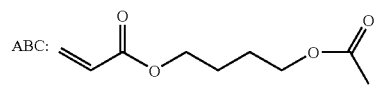

ABC:

TABLE C2

| Composition | Compound | Dopant | Phase behavior |
|---|---|---|---|
| 1 | 15 | 39 | K 77-80 N* 120 poly |
| 2 | 17 | 39 | <30 N* 123-127 I |
| 3 | 33 | 39 | K 96-106 N* 138 poly |
| 4 | 34 | 39 | <30 N* 131 poly |

It can be taken from Tables C1 and C2 that especially compounds with lateral substituents in the mesogenic molecular moiety, for instance alkyl radicals (cf. compounds 13 to 18 in Table C1 and compositions 1 and 2 in Table C2) or alkoxycarbonyl radicals (cf. compounds 33 to 37 in Table C1 and compositions 3 and 4 in Table C2), with increasing alkyl chain length of the lateral substituents, have a broader range of existence of the nematic or chiral nematic phase, a trend toward lower melting and clarifying points and marked supercooling effects, which is advantageous for the performance properties of the inventive compounds and liquid crystal compositions.

In addition, it is possible using the above-described inventive nematic compounds or chiral nematic compositions to produce polymer films in low thicknesses of down to a few micrometers, which have excellent homogeneous nematic or chiral nematic alignment and high stability. These films are obtained, for example, by knifecoating solutions of these compounds or compositions (possible solvents include, for instance, methyl ethyl ketone, tetrahydrofuran or toluene and also mixtures of these solvents) to polyethylene terephthalate (PET) or triacetylcellulose (TAC) substrates—these are usually films—and subsequent UV curing. For the precise procedure with regard to the production of such films, reference is made, for example, to the document WO 99/11733 A1.

What is claimed is:

1. A compound of the general formula I

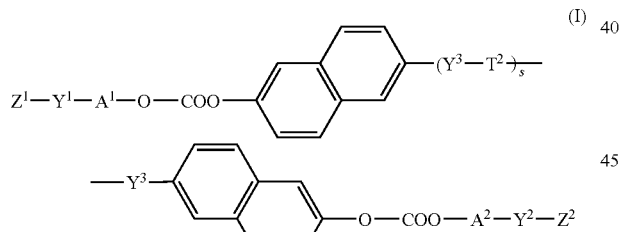

(I)

wherein:
Z$^1$, Z$^2$ are each independently hydrogen, optionally substituted C$_1$-C$_{20}$-alkyl in which the carbon chain may be interrupted by oxygen atoms in ether function, sulfur atoms in thioether function or by nonadjacent imino or C$_1$-C$_4$-alkylimino groups, or reactive radicals by means of which polymerization can be brought about;
A$^1$, A$^2$ are each independently spacers having from 1 to 30 carbon atoms, in which the carbon chain may be interrupted by oxygen atoms in ether function, sulfur atoms in thioether function or by nonadjacent imino or C$_1$-C$_4$-alkylimino groups;
Y$^1$, Y$^2$ are each independently a chemical single bond, oxygen, sulfur, —CO—, —O—CO—, —CO—O—, —S—CO—, —CO—S—, —NR—CO— or —CO—NR—;
Y$^3$ is a chemical single bond, oxygen, sulfur, —CR=CR—, —C≡C—, —CR=CR—CO—O—, —O—CO—CR=CR—, —C≡C—O—, —O—C≡C—, —CH$_2$—CH$_2$—, —CH$_2$—O—, —O—CH$_2$—, —CH$_2$—S—, —S—CH$_2$—, —CO—, —O—CO—, —CO—O—, —S—CO—, —CO—S—, —NR—CO—, —CO—NR—, —O—CO—O—, —O—CO—NR— or —NR—CO—O—;
R is hydrogen or C$_1$-C$_4$-alkyl;
T$^2$ is a divalent saturated or unsaturated, optionally substituted iso- or heterocyclic radical;
s is 0, 1, or 2;
when s>0, the variables T$^2$ may be same as one another or different from one another;
when s>0, the variables Y$^3$ may be same as one another or different from one another; and
both hydrogen atoms in the 2,6-naphthyl radical and hydrogen atoms bonded to carbon atoms in the variables Z$^1$, Z$^2$, A$^1$, A$^2$, Y$^3$, R, and T$^2$ may be substituted partly or fully by halogen atoms.

2. The compound according to claim 1, in which the variable T$^2$ is:

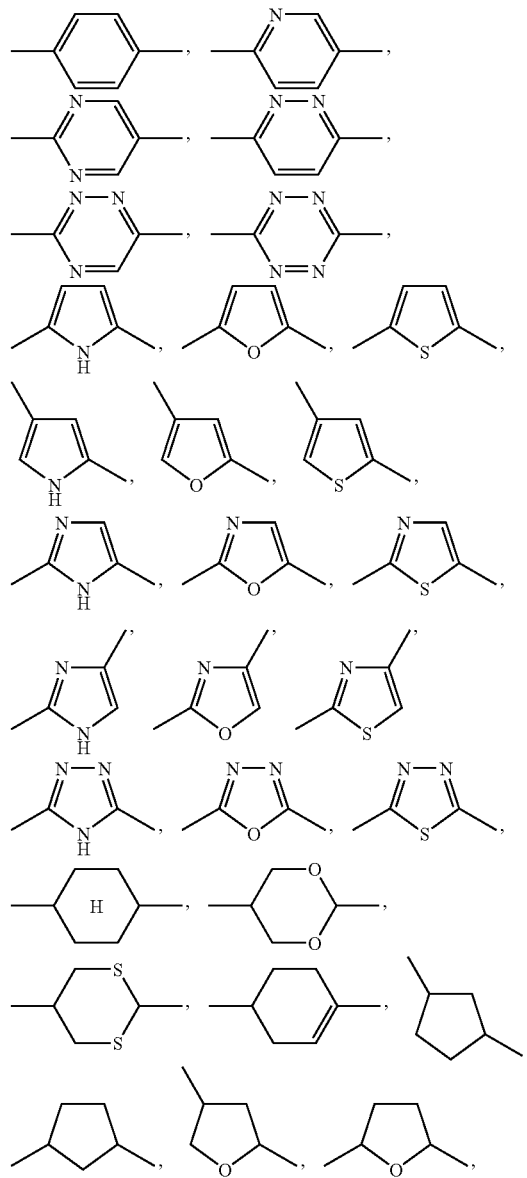

-continued

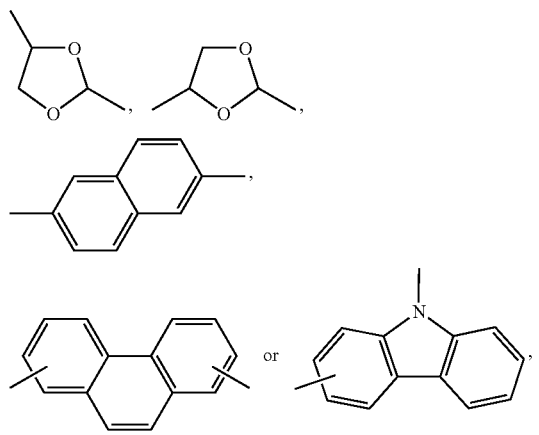

wherein:
the radicals

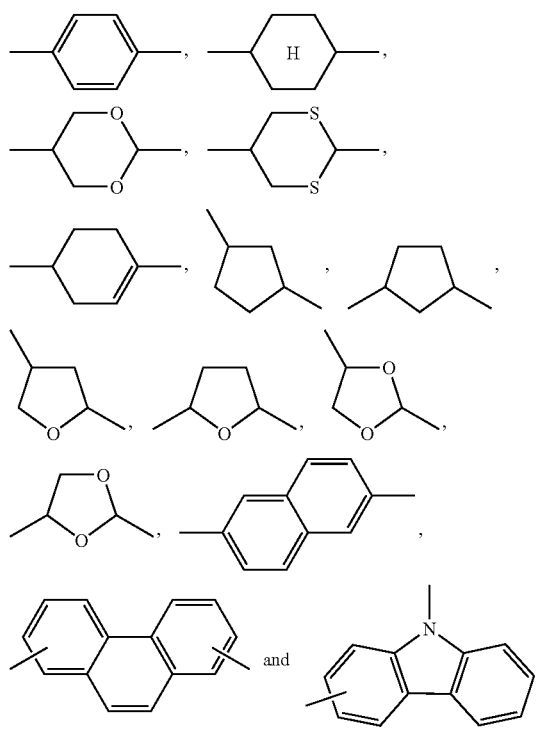

may be substituted by up to four identical or different substituents;
the radical

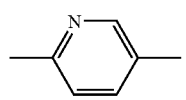

may be substituted by up to three identical or different substituents;

the radicals

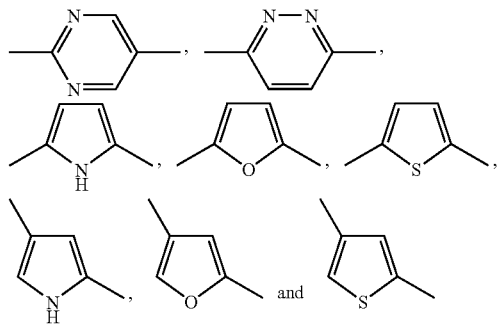

may be substituted by up to two identical or different substituents; and
the radicals

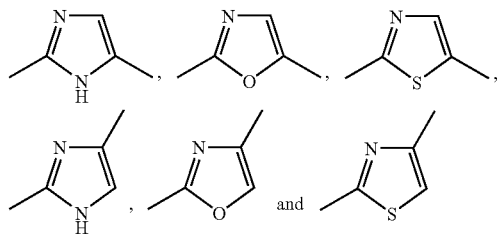

may be substituted by one substituent halogen, $NO_2$, NO, CN, CHO, $L^1$, CO-$L^1$, $X^1$—CO-$L^1$, $X^1$—SO-$L^1$, $X^1$—$SO_2$-$L^1$, $X^1$-$L^{1'}$, CO—$X^1$-$L^{1'}$, O—CO—$X^1$-$L^{1'}$, SO—$X^1$-$L^{1'}$ or $SO_2$-$X^1$-$L^{1'}$;

wherein:

$L^1$ is $C_1$-$C_{20}$-alkyl, $C_2$-$C_{20}$-alkenyl, $C_2$-$C_{20}$-alkynyl, $C_6$-$C_{10}$-aryl, heteroaryl having from 2 to 12 carbon atoms, $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_1$-$C_{20}$-alkenyl or heteroaryl-$C_1$-$C_{20}$-alkynyl having in each case from 2 to 12 carbon atoms in the heteroaryl radical, where the $C_1$-$C_{20}$ carbon chain may be interrupted by oxygen atoms in ether function, sulfur atoms in thioether function, nonadjacent imino, $C_1$-$C_{20}$-alkylimino and/or carbonyl groups, and both the $C_6$-$C_{10}$-aryl and the heteroaryl may be substituted by one or more substituents selected from the group consisting of halogen, $NO_2$, NO, CN, CHO, $L^2$, CO-$L^2$, $X^2$—CO-$L^2$, $X^2$—SO-$L^2$, $X^2$—$SO_2$-$L^2$, $X^2$-$L^{2'}$, CO—$X^2$-$L^{2'}$, O—CO—$X^2$-$L^{2'}$, SO—$X^2$-$L^{2'}$ and $SO_2$—$X^2$-$L^{2'}$;

$L^{1'}$ is hydrogen or, independently of $L^1$, as defined for $L^1$;

$L^2$ is $C_1$-$C_{20}$-alkyl, $C_2$-$C_{20}$-alkenyl, $C_2$-$C_{20}$-alkynyl, $C_6$-$C_{10}$-aryl, heteroaryl having from 2 to 12 carbon atoms, $C_6$-$C_{10}$-aryl-$C_1$-$C_{20}$-alkyl, $C_6$-$C_{10}$-aryl-$C_2$-$C_{20}$-alkenyl, $C_6$-$C_{10}$-aryl-$C_2$-$C_{20}$-alkynyl, heteroaryl-$C_1$-$C_{20}$-alkyl, heteroaryl-$C_2$-$C_{20}$-alkenyl or heteroaryl-$C_2$-$C_{20}$-alkynyl having in each case from 2 to 12 carbon atoms in the heteroaryl radical;

$L^{2'}$ is hydrogen or, independently of $L^2$, as defined for $L^2$;

$X^1$, $X^2$ are each independently oxygen, sulfur or $NL^{1'}$ or $NL^{2'}$; and some or all of the hydrogen atoms bonded to carbon atoms in the $L^1$ and/or $L^2$ radicals may be substituted by halogen atoms.

3. The compound according to claim 1, wherein the $Z^1$-$Y^1$-$A^1$- and -$A^2$-$Y^2$-$Z^2$ moieties are the same.

4. The compound according to claim 1, wherein $Z^1$ and/or $Z^2$ are reactive radicals

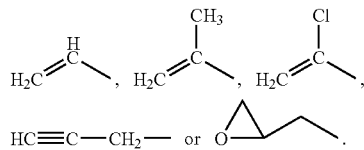

5. The compound according to claim 1, wherein $Z^1$ and/or $Z^2$ are reactive radicals

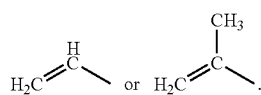

6. The compound according to claim 1, wherein $Z^1$-$Y^1$ and/or $Z^2$-$Y^2$ are reactive moieties:

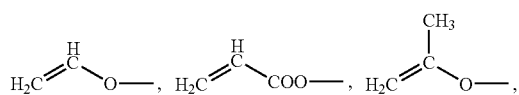

-continued

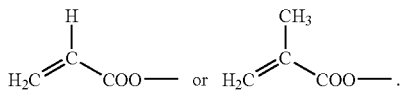

7. The compound according to claim 1, wherein $Z^1$-$Y^1$ and/or $Z^2$-$Y^2$ are reactive moieties

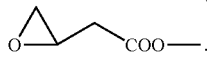

8. A polymerizable or nonpolymerizable liquid-crystalline composition, comprising:
   from 10 to 100% by weight of the compound according to claim 1;
   from 0 to 90% by weight of further monomers;
   from 0 to 50% by weight of one or more chiral compounds; and
   from 0 to 90% by weight of further additives;
   wherein a sum of the proportions of the components is 100% by weight.

9. An oligomer or polymer obtained by oligomerization or polymerization of the polymerizable liquid-crystalline composition according to claim 8.

10. A process for printing or coating a substrate, comprising:
    applying the polymerizable liquid-crystalline composition according to claim 8 to the substrate; and
    subsequently polymerizing the composition.

11. A process for preparing compounds of the formula Ia'

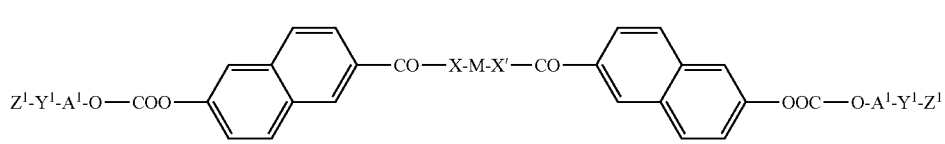

or of the formula Ib'

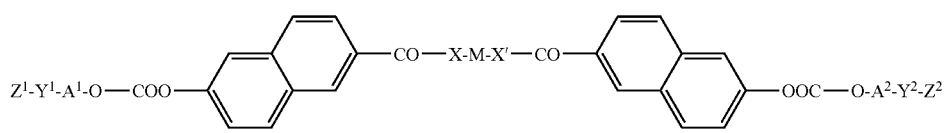

wherein
M is a moiety of the formula $T^2$-$(Y^3$-$T^2$-$)_{s''}$;
s'' is 0 or 1;
when s''>0, each $T^2$ may be the same or different;
X and X' are each independently oxygen or sulfur;
$Z^1$, $Z^2$ are each independently hydrogen, optionally substituted $C_1$-$C_{20}$-alkyl in which the carbon chain may be interrupted by oxygen atoms in ether function, sulfur atoms in thioether function or by nonadjacent imino or $C_1$-$C_4$-alkylimino groups, or reactive radicals by means of which polymerization can be brought about;
$A^1$, $A^2$ are each independently spacers having from 1 to 30 carbon atoms, in which the carbon chain may be inter- -continued

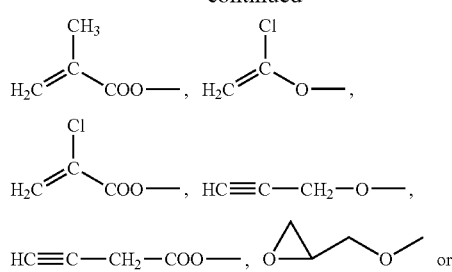

rupted by oxygen atoms in ether function, sulfur atoms in thioether function or by nonadjacent imino or $C_1$-$C_4$-alkylimino groups;

$Y^1$, $Y^2$ are each independently a chemical single bond, oxygen, sulfur, —CO—, —O—CO—, —CO—O—, —S—CO—, —CO—S—, —NR—CO— or —CO—NR—;

$Y^3$ is a chemical single bond, oxygen, sulfur, —CR═CR—, —C≡C—, —CR═CR—CO—O—, —O—CO—CR═CR—, —C≡C—O—, —O—C≡C—, —CH$_2$—CH$_2$—, —CH$_2$—O—, —O—CH$_2$—, —CH$_2$—S—, —S—CH$_2$—, —CO—, —O—CO—, —CO—O—, —S—CO—, —CO—S—, —NR—CO—, —CO—NR—, —O—CO—O—, —O—CO—NR— or —NR—CO—O—; and $T^2$ is a divalent saturated or unsaturated, optionally substituted iso- or heterocyclic radical, the process comprising:

reacting a compound of the formula II'

HX-M-X'H    II' with an appropriate number of moles of a carboxylic acid derivative of the formula IIIa'

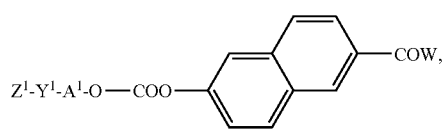

(IIIa')

optionally in the presence of one or more auxiliary compounds, to give the symmetrical compound of the formula Ia'; or reacting a compound of the formula II', in a first step, with an appropriate number of moles of a carboxylic acid derivative of the formula IIIa', optionally in the presence of one or more auxiliary compounds, and, in a second step, with an appropriate number of moles of a carboxylic acid derivative of the formula IIIb'

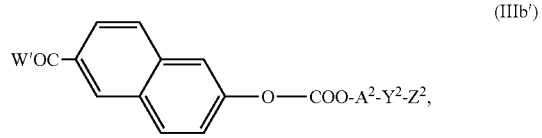

(IIIb')

optionally in the presence of one or more auxiliary compounds, to give the unsymmetrical compound of the formula Ib', where W and W' are identical or different leaving groups which leave in the reaction or are identical or different precursor groups which can be converted to a leaving group with the auxiliary compound(s) which is/are optionally present.

12. A method for producing a thermal insulating coating comprising adding the liquid-crystalline composition according to claim 8 to an insulation coating;

wherein the insulation coating comprises one or more cholesteric layers that reflects at least 40% of incident radiation in the infrared wavelength region.

13. The method according to claim 8, wherein the coating has a transmission of at least 80% of incident radiation in a wavelength range of from about 390 nm to 750 nm.

14. A thermal insulation coating, comprising one or more cholesteric layers obtained using the liquid-crystalline composition according to claim 8;

wherein the coating reflects at least 40% of incident radiation in the infrared wavelength range.

15. The thermal insulation coating according to claim 14, wherein the coating has a transmission of at least 80% of incident radiation in a wavelength range from about 390 nm to 750 nm.

* * * * *